United States Patent
Sinha

(10) Patent No.: US 10,353,094 B2
(45) Date of Patent: Jul. 16, 2019

(54) METHOD FOR ESTIMATING ANISOTROPIC MECHANICAL PROPERTIES OF A RESERVOIR USING SONIC LOGGING DATA

(71) Applicant: Schlumberger Technology Corporation, Sugar Land, TX (US)

(72) Inventor: Bikash K. Sinha, Cambridge, MA (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 278 days.

(21) Appl. No.: 15/085,982

(22) Filed: Mar. 30, 2016

(65) Prior Publication Data

US 2016/0291181 A1 Oct. 6, 2016

Related U.S. Application Data

(60) Provisional application No. 62/139,985, filed on Mar. 30, 2015.

(51) Int. Cl.
G01V 1/30 (2006.01)
G01V 1/28 (2006.01)
G01V 1/50 (2006.01)

(52) U.S. Cl.
CPC ............. *G01V 1/306* (2013.01); *G01V 1/284* (2013.01); *G01V 1/50* (2013.01); *G01V 2210/1299* (2013.01); *G01V 2210/1429* (2013.01); *G01V 2210/626* (2013.01); *G01V 2210/6242* (2013.01)

(58) Field of Classification Search
CPC .......... G01V 1/306; G01V 1/284; G01V 1/50; G01V 2210/1299; G01V 2210/1429; G01V 2210/626; G01V 2210/6242
See application file for complete search history.

(56) References Cited

U.S. PATENT DOCUMENTS

| | | | |
|---|---|---|---|
| 8,175,807 B2 | 5/2012 | Suarez-Rivera | |
| 2009/0210160 A1* | 8/2009 | Suarez-Rivera | G01V 11/00 702/6 |

OTHER PUBLICATIONS

Franquet et al., Orthotropic Horizontal Stress Characterization from Logging and Core-Derived Acoustic Anisotropies, Jun. 24-27, 2012, 46th US Rock Mechanics/Geomechanics Symposium, Chicago, IL, 9 pp.*

(Continued)

*Primary Examiner* — Toan M Le

(57) ABSTRACT

A method includes applying acoustic waves to the formation and detecting acoustic waves to acquire acoustic data. The method further includes determining (i) at least one of elastic constant $C_{13}$ and elastic constant $C_{23}$, (ii) elastic constant $C_{33}$, (iii) at least one of elastic constant $C_{44}$ and elastic constant $C_{55}$, and (iv) elastic constant $C_{66}$ using the acquired acoustic data. Elastic constant $C_{11}$ is determined using elastic constant $C_{33}$, at least one of elastic constant $C_{44}$ and elastic constant $C_{55}$, elastic constant C66, and a relationship between Thomsen parameter gamma and Thomsen parameter epsilon.

16 Claims, 26 Drawing Sheets

(56) References Cited

OTHER PUBLICATIONS

Amorocho et al., Real Time Fracture Placement and Completion Design Using an Azimuthal LWD Sonic and Spectral Gamma Ray Analysis for an Anisotropic Unconventional Reservoir Evaluation, Oct. 21-23, 2014, SPE Eastern Regional Meeting, Charleston, WV, 11 pp.*

Willis et al., A Novel Approach to Upscaling Elastic Moduli in Unconventional Reservoirs, Jun. 1-4, 2014, 48th US Rock Mechanics/Geomechanics Symposium, Minneapolis, MN, 11 pp.*

J.J. Walsh, et al. "Derivation of anisotropy parameters in a shale using borehole sonic data," American Rock Mechanics Association, 42nd US Rock Mechanics Symposium, San Francisco, 2008.

A.N. Tutuncu, "Anisotropy, Compaction and Dispersion Characteristics of Reservoir and Seal Shales," American Rock Mechanics Association, 44th us Rock Mechanics Symposium, and 5th US-Canada Rock Mechanics Symposium, Jun. 27-30, 2010.

M. Schoenberg, et al, "Seismic anisotropy of fractured rock," Geophysics, vol. 60, No. 1, pp. 204-211, Jan.-Feb. 1995.

V. Pistre, et al, "A New Modular Sonic Tool Provides Complete Acoustic Formation Characterization," SEG Houston 2005 Annual Meeting, pp. 368-372.

J. Jocker, et al, "TI Anisotropic Model Building Using Borehole Sonic Logs Acquired in Heterogeneous Formations," SEG Houston 2013 Annual Meeting, pp. 305-309.

G.A. Waters, et al., "The Effect of Mechanical Properties Anisotropy in the Generation of Hydraulic Fractures in Organic Shales," SPE Annual Technical Conference and Exhibition, Denver, Oct. 30-Nov. 2, 2011.

J. Jocker, et al., "Seismic Anisotropy Characterization in Heterogeneous Formations Using Borehole Sonic Data," SPE Annual Technical Conference and Exhibition, New Orleans, Sep. 30-Oct. 2, 2013.

J. Walsh, et al, "Formation Anisotropy Parameters Using Borehole Sonic Data," SPWLA 47th Annual Logging Symposium, Jun. 4-7, 2006.

* cited by examiner

INVERTED: $C_{44}=14.53$ GPa; $C_{33}=36.73$; $C_{13}=9.3$; $C_{66}=16.92$

METHOD FOR ESTIMATING ANISOTROPIC MECHANICAL PROPERTIES OF A RESERVOIR USING SONIC LOGGING DATA

CROSS-REFERENCE TO RELATED APPLICATIONS

This application is based upon and claims the benefit of the priority of U.S. Provisional Application Ser. No. 62/139,985 entitled "METHOD FOR ESTIMATING ANISOTROPIC MECHANICAL PROPERTIES OF A RESERVOIR USING SONIC LOGGING DATA" filed on Mar. 31, 2015, the disclosure of which is incorporated herein in its entirety by reference thereto.

TECHNICAL FIELD

This disclosure relates to well logging in the oil and gas field. In particular, this disclosure relates to determining reservoir formation properties using sonic well logging data.

BACKGROUND

Sonic data can provide useful inputs to completion of unconventional reservoirs for enhanced productivity. Unconventional reservoirs are characterized by low permeability. Economical production of such gas-shale (or oil-shale) reservoirs is made possible by proper selection of hydraulic fracturing stages and perforation clusters that contribute to the hydrocarbon productivity.

Gas-shale (or oil-shale) reservoirs may be characterized by orthorhombic anisotropy with 9 independent elastic constants in the presence of triaxial formation stresses or vertically aligned fractures. In the absence of formation stresses and fractures, shale lithology can be described by transversely-isotropic (TI) anisotropy with five independent elastic constants, assuming that the vertical pilot well is parallel to the TI-symmetry $X_3$-axis and the $X_1$-$X_2$ is the cross-sectional isotropic plane. Referred to these anisotropic axes, conventional workflows to determine minimum horizontal stress as a function of vertical depth require estimates of elastic constants $C_{13}$ and $C_{33}$. While the elastic constant $C_{33}$ is directly obtained from the monopole compressional head wave slowness (or velocity) in a vertical pilot well, the elastic constant $C_{13}$ is estimated from other sources, such as, plane wave velocity measurements on oblique core plugs or combining wellbore sonic data from both a vertical and deviated sections in the same shale lithology as described in Jocker, J., M. Feria, F. Pampuri, E. Wielemaker, S. Sunaga, 2013a, TI anisotropic model building using borehole sonic logs acquired in heterogeneous formations: SEG Technical Program Expanded Abstracts 2013, SEG International Exposition and 83rd Annual Meeting, Houston, Tex., Sep. 22-27, 2013, pp. 305-309 and Jocker, J., M. Feria, F. Pampuri, E. Wielemaker, 2013b, Seismic anisotropy characterization in heterogeneous formations using borehole sonic data: Paper 166463, SPE Annual Technical Conference and Exhibition, 30 September-2 October, New Orleans, La., or invoking approximate rock physics models that need to be calibrated against core data from the same shale lithology interval. A major limitation of conventional workflows is that sonic data from an enormously large volume of earth (on the order of hundreds of feet) is assumed to be representative of an effectively homogeneous and anisotropic formation. However, it is known that shale reservoirs are significantly heterogeneous in their mechanical properties and averaging elastic properties over large volumes does not reflect spatial variations that need to be accounted for in a proper placement of fracturing stages and perforation clusters for an economic production of hydrocarbons. Generally, dimensions of fracturing stages and perforation clusters are on the order of several feet to several inches along the producing well and it is, therefore, important to identify heterogeneities on this scale.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a method for estimating elastic constants within a formation. The method includes applying acoustic waves to the formation and detecting acoustic waves to acquire acoustic data. The method further includes determining (i) at least one of elastic constant $C_{13}$ and elastic constant $C_{23}$, (ii) elastic constant $C_{33}$, (iii) at least one of elastic constant $C_{44}$ and elastic constant $C_{55}$, and (iv) elastic constant $C_{66}$ using the acquired acoustic data. Elastic constant $C_{11}$ is determined using (i) elastic constant $C_{33}$, (ii) at least one of elastic constant $C_{44}$ and elastic constant $C_{55}$, (iii) elastic constant $C_{66}$, and (iv) a relationship between Thomsen parameter gamma and Thomsen parameter epsilon.

In some embodiments, minimum and maximum horizontal stresses for the formation may be determined using (i) elastic constant $C_{11}$, (ii) at least one of elastic constant $C_{13}$ and elastic constant $C_{23}$, (iii) elastic constant $C_{33}$, and (iv) elastic constant $C_{66}$. The method may be performed for a vertical pilot well traversing an unconventional reservoir. The minimum and maximum horizontal stresses may be used to determine placement of a lateral wellbore along the vertical pilot well.

Various embodiments of the present disclosure are also directed to another method for estimating elastic constants within a formation. The method includes applying acoustic waves to the formation and detecting acoustic waves to acquire acoustic data. The method further includes determining (i) elastic constant $C_{11}$, (ii) at least one of elastic constant $C_{13}$ and elastic constant $C_{23}$, (iii) at least one of elastic constant $C_{44}$ and elastic constant $C_{55}$, and (iv) elastic constant $C_{66}$ using the acquired acoustic data. Elastic constant $C_{33}$ are determined using (i) elastic constant $C_{11}$, (ii) at least one of elastic constant $C_{44}$ and elastic constant $C_{55}$, (iii) elastic constant $C_{66}$, and (iv) a relationship between Thomsen parameter gamma and Thomsen parameter epsilon.

In some embodiments, a vertical Young's modulus, horizontal Young's modulus, a horizontal Poisson's ratio, and two vertical Poisson's ratios may be determined using (i) elastic constant $C_{11}$, (ii) at least one of elastic constant $C_{13}$ and elastic constant $C_{23}$, and (iii) elastic constant $C_{33}$. The method may be performed for a lateral wellbore traversing an unconventional reservoir. Placement of completions or fractures along the lateral wellbore can be determined using at least one of the three Poisson's ratios.

BRIEF DESCRIPTION OF THE DRAWINGS

Those skilled in the art should more fully appreciate advantages of various embodiments of the present disclosure from the following "Detailed Description" discussed with reference to the drawings summarized immediately below.

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
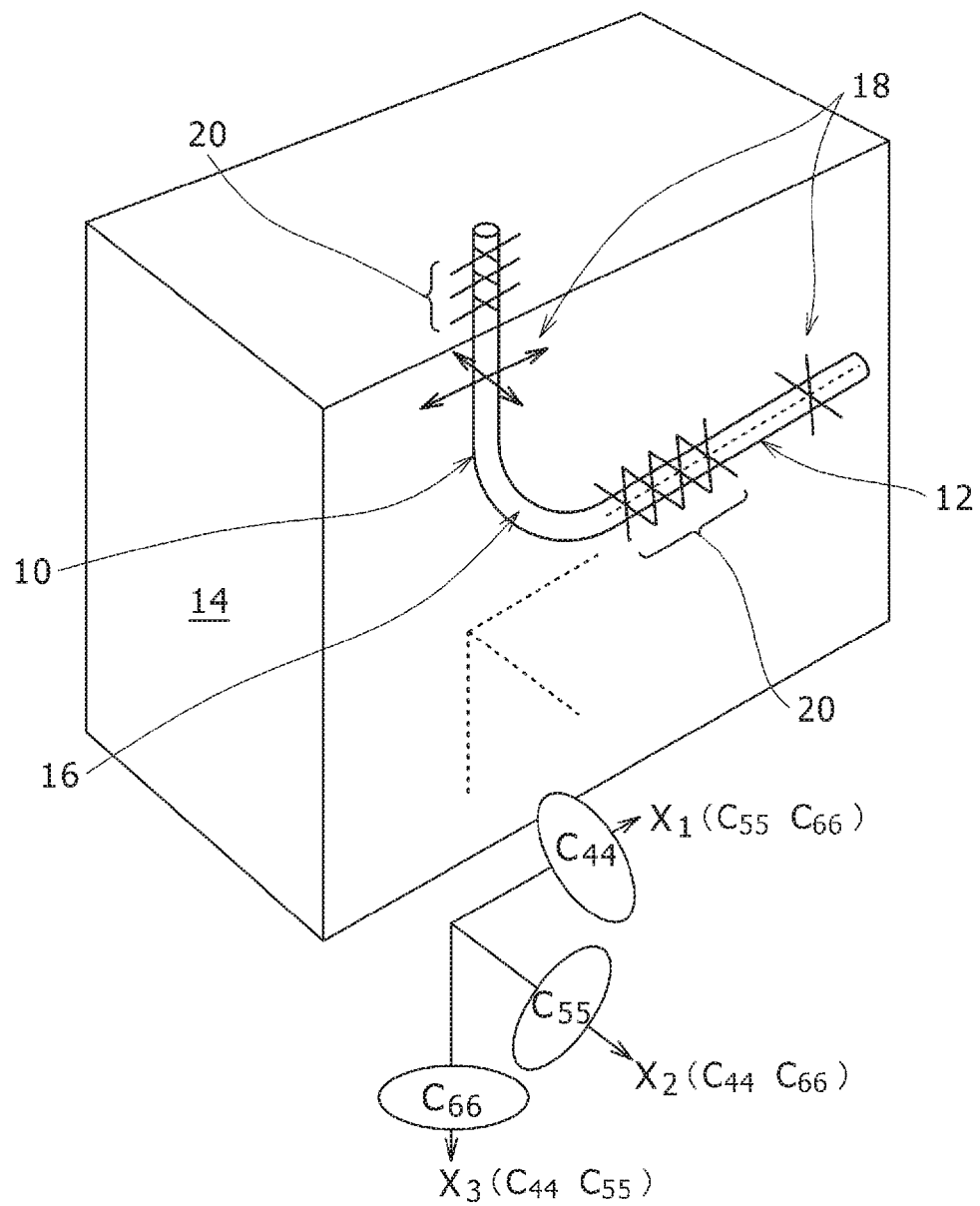
FIG. 1 shows a schematic illustration of a pilot vertical wellbore parallel to an $X_3$-axis and a lateral wellbore parallel to the $X_1$-axis in a transversely-isotropic formation, according to an embodiment of the disclosure.

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

Shale-gas reservoirs exhibit orthorhombic anisotropy in the presence of either vertically aligned fractures or triaxial stresses aligned with the anisotropy axes together with typical horizontal laminations. Currently, estimates of the off-diagonal elements of the elastic stiffness tensor $C_{13}$ and $C_{23}$ are based either on rock physics based model or oriented core plug velocity data analysis. Both of these approaches have limitations in dealing with the known spatial heterogeneity in shale gas reservoirs. Various embodiments of the methods described herein use inversion algorithms to estimate the elastic constants $C_{13}$ and $C_{23}$ from cross-dipole dispersions from a single-well sonic data.

The present disclosure is directed to a method of estimating a sub-set of orthorhombic constants and anisotropic mechanical properties in terms of Young's moduli and Poisson's ratios from sonic data acquired in a vertical pilot and lateral producer wells in unconventional reservoirs. Results from processing sonic data in a vertical wellbore provide estimates of the minimum horizontal stress distribution and mechanical properties as a function of vertical depth. Minimum horizontal stress distribution together with rock mechanical properties help in optimal placement of a lateral that would constrain the hydraulically induced fractures within a reservoir placed between higher stress cap rocks. In addition, results from the processing of sonic data from a horizontal producer well yield stress distributions and anisotropic properties along a lateral that would help in a proper selection of fracturing stages and perforation clusters. Intervals with reduced Poisson's ratios help to estimate the orientation of hydraulically induced fractures that would contribute to a more efficient drainage of hydrocarbons from a reservoir.

The present disclosure describes a method for obtaining some or all relevant anisotropic constants from sonic data acquired in a single wellbore running either parallel, perpendicular, or inclined with the vertical direction. Rock anisotropic constants can then be transformed into stress distributions and mechanical properties in terms of Young's moduli and Poisson's ratios. These mechanical properties can then be used to design optimal completions for hydrocarbon reservoirs, such as unconventional reservoirs. Completion design for unconventional reservoirs uses estimates of stress distributions as well as anisotropic elastic properties. Spatial variations in in-situ stresses and anisotropic elastic properties may be obtained over a logging depth interval on the order of tens of feet. This is consistent with typical fracturing stages and perforation cluster geometrical layout. Various embodiments of the method described herein for the inversion of wellbore sonic data from a vertical pilot well provide estimates of both the elastic constants $C_{33}$ and $C_{13}$. Since both of these elastic constants are determined from sonic data acquired in a single well, estimated elastic constants reflect average anisotropic properties over an effective volume probed by the sonic tool. Sonic data probes a volume defined by an axial distance across an array of receivers and radial distance determined by the signal frequencies. Generally, the axial distance covered by the receiver aperture is 6 feet (assuming 13 axial receivers with an inter-receiver spacing of 6 inches), and the radial distance probed is about 3 to 6 feet from the wellbore surface in a typical shale formation with signal frequencies ranging from 1 to 3 kHz. Multi-shot processing using a sub-array of five receivers can reduce the axial averaging length to 2 feet. Thus, any presence of heterogeneities on the scale of a few feet is properly accounted for and is reflected in terms of variations in the elastic constants $C_{33}$ and $C_{13}$, as a function of measured depth. A preferred placement of a lateral producing well may be placed between over- and under-burden layers with higher minimum horizontal stresses than the target reservoir thickness. One of the advantages in methods of the disclosures herein is to fracture the producing reservoir in such a way that hydraulically induced fractures are constrained within the same target lithology.

Optimal placement of fracturing stages and perforation clusters along a lateral producer well may use knowledge of horizontal stresses and anisotropic mechanical properties as a function of measured depth. Wellbore sonic data acquired along a lateral producer well may be processed to obtain the maximum and minimum horizontal stress distributions together with rock mechanical properties. Large differences between the maximum and minimum horizontal stresses can help to produce long and deep hydraulic fractures for higher productivity. Various embodiments of the method described herein may estimate anisotropic rock properties as a function logged depth along a lateral and thereby (i) account for the spatial variability, (ii) help in an improved placement of fracturing stages within a reasonably uniform lithology interval, and (iii) provide useful information about the orientation of hydraulically induced fractures for an enhanced recovery of hydrocarbons from unconventional formations. Anisotropic rock properties are described in terms of a vertical ($Y_{33}$) and horizontal ($Y_{11}$) Young's moduli, together with the horizontal Poisson's ratio ($v_{12}$) and vertical Poisson's ratios ($v_{13}$ and $v_{31}$). Invoking transversely-isotropic (TI-) anisotropy for the shale lithology, estimated TI-constants may be transformed into the 2 Young's moduli and 3 Poisson's ratios. Spatial distribution of anisotropic Poisson's ratios are particularly useful to identify intervals that would be more amenable to support horizontal or vertically aligned fractures. For example, intervals with smaller values of $v_{12}$ are likely to support horizontal fractures, whereas intervals with smaller values of $v_{13}$ and $v_{31}$ would support vertically aligned fractures.

Sonic data acquired in a vertical pilot and a lateral (horizontal) producer wells may be processed to obtain the following set of orthorhombic elastic constants:

[Vertical well parallel to the $X_3$-axis] Inversion of the fast flexural dispersion provides estimates of $C_{55}$, $C_{66}$, and $C_{13}$, whereas the slow flexural dispersion yields $C_{44}$ and $C_{23}$. The monopole compressional headwave slowness can be processed to yield the elastic constant $C_{33}$. Stoneley dispersion can also be inverted to yield $C_{66}$.

[Horizontal well parallel to the $X_1$-axis] If the lateral well is parallel to the $X_1$-axis and the vertical direction is parallel to the $X_3$-axis, the fast dipole polarization is oriented along the horizontal $X_2$-direction and the slow dipole polarization is parallel to the vertical $X_3$-direction. Processing of the fast and slow dipole waveforms recorded at an array of receivers yields the fast and slow flexural dispersions, respectively. Inversion of the fast flexural dispersion provides estimates of $C_{66}$, $C_{44}$, and $C_{13}$, whereas the slow flexural dispersion yields $C_{55}$ and $C_{23}$. The monopole compressional headwave slowness may be processed to yield the elastic constant $C_{11}$. Stoneley dispersion can be inverted to yield $C_{44}$.

[Horizontal well parallel to the $X_2$-axis] If the lateral well is parallel to the $X_2$-axis and the vertical direction is parallel to the $X_3$-axis, the fast dipole polarization is oriented along the horizontal $X_1$-direction and the slow dipole polarization is parallel to the vertical $X_3$-direction. Processing of the fast and slow dipole waveforms recorded at an array of receivers yields the fast and slow flexural dispersions, respectively. Inversion of the fast flexural dispersion provides estimates of $C_{66}$, $C_{55}$, and $C_{23}$, whereas the slow flexural dispersion yields $C_{44}$ and $C_{13}$. The monopole compressional headwave slowness can be processed to yield the elastic constant $C_{22}$. Stoneley dispersion can also be inverted to yield $C_{55}$. Insofar as there is a reasonable correlation between the Thomsen parameters γ and ε, $C_{33}$ may be estimated in terms of measured $C_{11}$, $C_{66}$, and $C_{44}$ obtained from the horizontal well logging.

Geomechanical analyses are inputs to a completion method for unconventional reservoirs with extremely low permeability. This method includes the following two processes.

First, the monopole and cross-dipole data from a vertical pilot well are analyzed to obtain the horizontal stress distributions as a function of vertical depth. Both the minimum horizontal stress magnitude and azimuthal direction are required for an optimal placement of a lateral. The minimum and maximum horizontal stress directions can be reliably estimated in the presence of a shear slowness splitting in a TIV (Transversely-Isotropic with its symmetry axis parallel to the vertical direction) formation when there is no evidence of any fractures intersecting the wellbore that can be determined from an image log. In the absence any fractures, the fast shear azimuth corresponds to the maximum horizontal stress direction. A preferred depth interval for the placement of a lateral may be the one placed between layers with higher minimum horizontal stresses that help to constrain the vertical hydraulic fractures within the producing layer. Hydraulic fracturing operation introduces vertical fractures in the cross-sectional plane of the horizontal producer well drilled parallel to the minimum horizontal stress direction in a normal fault stress regime ($\sigma_V > \sigma_{Hmax} > \sigma_{hmin}$). In contrast, when a lateral is aligned with the maximum horizontal stress direction, hydraulic fracturing operation would typically introduce axial fractures in a normal fault stress regime.

Second, analyses of the monopole and cross-dipole sonic data acquired in a lateral well can help to optimally select the depth intervals or stages for fracture treatment. Subsequently, the placement and number of perforation clusters are determined that would support long and deep conducting fractures. Optimal selection of fracture stages and placement of perforation clusters uses knowledge of mechanical properties as well as relative magnitudes of the maximum and minimum horizontal stress magnitudes as a function of measured depth along a lateral. Generally, locations with higher Young's moduli and lower Poisson's ratios together with large differences between the maximum and minimum horizontal stress magnitudes would support long and deep fractures enabling enhanced flow of hydrocarbons to the producer well.

[Orthorhombic Anisotropy] Sandstones and carbonates subjected to triaxial stresses exhibit orthorhombic anisotropy with nine independent elastic constants. Unconventional shale resources subjected to the three principal stresses aligned with the intrinsic TI-anisotropy directions also exhibit orthorhombic anisotropy. Unconventional shale resources in the presence of vertically aligned natural fractures also exhibit orthorhombic anisotropy.

An orthorhombic formation may be characterized by anisotropic elastic stiffness tensor $C_{ij}$ described by the following elements:

$$C_{ij} = \begin{bmatrix} C_{11} & C_{12} & C_{13} & 0 & 0 & 0 \\ C_{12} & C_{22} & C_{23} & 0 & 0 & 0 \\ C_{13} & C_{23} & C_{33} & 0 & 0 & 0 \\ 0 & 0 & 0 & C_{44} & 0 & 0 \\ 0 & 0 & 0 & 0 & C_{55} & 0 \\ 0 & 0 & 0 & 0 & 0 & C_{66} \end{bmatrix} \quad (1)$$

where the following elastic stiffnesses can be estimated from compressional and dipole shear velocities measured from a sonic tool in a fluid-filled wellbore parallel to the $X_3$-axis in the presence of orthorhombic formation anisotropy:

$$C_{33} = \rho_b V_p^2, \quad (2)$$

$$C_{44} = \rho_b V_{slow-shear}^2, \quad (3)$$

$$C_{55} = \rho_b V_{fast-shear}^2. \quad (4)$$

and where $\rho_b$ is the formation bulk density, $V_p$ is the compressional velocity along the wellbore axis, $V_{slow-shear}$ is the slow dipole shear velocity, and $V_{fast-shear}$ is the fast dipole shear velocity.

In contrast, the presence of natural horizontal fractures and/or isotropic horizontal stresses ($\sigma_{Hmax} = \sigma_{hmin}$) in resource shales causes the formation to exhibit TIV anisotropy with its symmetry axis parallel to the $X_3$-axis. Under these circumstances, the two dipole shear velocities may be the same and the following relationships may be valid among the orthorhombic constants: $C_{44} = C_{55}$, $C_{13} = C_{23}$, and $C_{12} = C_{11} - 2 \times C_{66}$.

In addition, the shear modulus $C_{66}$ in the wellbore cross-sectional plane can be estimated from an inversion of monopole Stoneley data. However, conventional methods do not provide a way to estimate of off-diagonal elements $C_{13}$ and $C_{23}$ from sonic data acquired either in a single vertical pilot or lateral producer wellbores.

Various embodiments of the methods herein may be used to estimate these off-diagonal elements $C_{13}$ and $C_{23}$ from sonic data acquired either in a single vertical or horizontal wellbores.

[Flexural dispersions in orthorhombic formations] Fractional changes in the phase velocity of the wellbore flexural dispersion caused by changes from a chosen reference state in the elastic constants and mass density of the formation surrounding a fluid-filled wellbore can be expressed in terms of the following volume integral at a given wavenumber (Sinha, 1997):

$$\frac{\Delta V_k}{V_k^m} = \frac{\Delta \omega_k}{\omega_k^m} \quad (5)$$

$$= \frac{\int_V \Delta C_{lmpq} u_{l,m}^m u_{p,q}^m dV}{2(\omega_k^m)^2 \int_V \rho_0 u_q^m u_q^m dV} - \frac{\int_V \Delta \rho u_q^m u_q^m dV}{2 \int_V \rho_0 u_q^m u_q^m dV},$$

where $\Delta V_k / V_k^m$ and $\Delta \omega_k / \omega_k^m$, respectively, represent fractional changes in the phase velocity and angular frequency at a given wavenumber k; and $\Delta C_{lmpq}$ and $\Delta \rho$, respectively, denote differences in the elastic constants and mass density of the surrounding formation from those assumed in the effective isotropic reference state.

The effective isotropic reference state can be described by the two Lame constants λ and μ and mass density $\rho_o$. The eigensolution for a chosen wellbore mode m is denoted by the displacement $u_q^m$. $V_k^m$ and $\omega_k^m$ are the phase velocity and angular frequency at a given wavenumber k. This description uses Cartesian tensor notation for the elastic constants, a convention that a comma followed by an index m implies partial derivative with respect to $x_q$, and a summation convention for repeated indices. The Cartesian tensor indices l, m, p, and q take values 1, 2, and 3.

The eigensolution for a wellbore mode in the surrounding formation can be expressed as (Sinha, et al., 1994):

$$u_r = \left[\left\{\frac{n}{r}H_n^1(\alpha r) - \alpha H_{n+1}^1(\alpha r)\right\}A + \right.$$
$$\left. ikH_{n+1}^1(\beta r)A_1 + \frac{n}{r}H_n^1(\beta r)A_3\right]\cos n\phi e^{i(kz-\omega t)}, \quad (6)$$

$$u_\phi = \left[-\frac{n}{r}H_n^1(\alpha r)A + ikH_{n+1}^1(\beta r)A_1 + \right.$$
$$\left.\left\{-\frac{n}{r}H_n^1 + \beta H_{n+1}^1(\beta r)\right\}A_3\right]\sin n\phi e^{i(kz-\omega t)},$$

$$u_z = [ikH_n^1(\alpha r)A - \beta H_n^1(\beta r)A_1]\cos n\phi e^{i(kz-\omega t)},$$

where $$\alpha^2 = \frac{\omega^2}{V_1^2} - k^2, \quad (7)$$

$$\beta^2 = \frac{\omega^2}{V_2^2} - k^2,$$

$V_1$ and $V_2$ are the compressional and shear wave velocities, respectively. $H_n^1(x)$ denotes the Hankel function of the first-kind for outgoing waves, consistent with the assumed time dependence of $\exp(-i\omega t)$, which is defined as:

$$H_n^1(x) = J_n(x) + iY_n(x), \quad (8)$$

and $J_n(x)$ and $Y_n(x)$ are the n-th order Bessel functions of the first and second kinds, respectively. The solution for the displacement field in the surrounding formation is then used to calculate displacement gradients or corresponding strains required to calculate the perturbation integral in equation (1).

When the wellbore is deviated with respect to the earth anisotropic axes, equations of motion are written in terms of rotated elastic constants referred to the wellbore axes. The rotated elastic constants $C_{ij}^{dev}$ referred to the deviated wellbore axes can then be expressed in terms of TI-elastic constants and wellbore deviation $\theta$ from the TI-symmetry axis.

Fractional changes in the phase velocity of a particular wellbore mode are expressed in terms of frequency-dependent sensitivity coefficients that include the influence of wellbore deviations from the earth anisotropy axes, and changes in the TI constants (after invoking the relationships $C_{44} = C_{55}$, $C_{13} = C_{23}$, and $C_{12} = C_{11} - 2C_{66}$) as:

$$\frac{\Delta V}{V} = S_{11}\Delta C_{11} + S_{33}\Delta C_{33} + S_{55}\Delta C_{55} + S_{66}\Delta C_{66} + S_{13}\Delta C_{13}, \quad (9)$$

where the sensitivity coefficients are defined as:

$$S_{pq}(k_i) = \frac{\int_V E_p^m E_q^m dV}{2(\omega_{ki}^m)^2 \int_V \rho_0 u_j^m u_j^m dV} = \frac{\Delta V}{V\Delta C_{pq}}, \quad (10)$$

where the indices p and q denote the compressed Voigt's notation and take on values 1, 2, 3, . . . 6 and the strain $E_p^m$ is defined by:

$$E_p^m = E_{ij}^m = \frac{1}{2}(u_{i,j}^m + u_{j,i}^m), \quad (11)$$

and $u_j^m$ denotes the displacement associated with the eigen-solution of a fluid-filled wellbore surrounded by an effective isotropic and radially homogeneous formation. It is noted that $\Delta C_{pq}$ is expressed in terms of the TI-constants $C_{pq}$ as shown above in equations (9) after integrating the solution azimuthally over $\varphi$ as indicated in equations (6). Differences between the TI-elastic constants and chosen effective isotropic constants in the reference state are defined by:

$$\Delta C_{11} = C_{11} - (\lambda + 2\mu),$$

$$\Delta C_{33} = C_{33}(2 + \mu),$$

$$\Delta C_{55} = C_{55} - \mu,$$

$$\Delta C_{66} = C_{66} - \mu,$$

$$\Delta C_{13} = C_{13} - \lambda. \quad (12)$$

[Vertical well parallel to the $X_3$-axis] Cross-dipole waveforms recorded at an array of receivers may be processed to obtain the fast and slow dipole dispersions. Herein, it is assumed that the fast dipole waveforms are generated by a dipole transmitter oriented parallel to the $X_1$-axis in a fluid-filled wellbore parallel to the $X_3$-axis. The fractional changes in the flexural wave velocities at a given wavenumber can be expressed in terms of the changes in the effective five TI-constants from a chosen reference state and corresponding sensitivity coefficients as given by equation (9):

$$\frac{\Delta V}{V} = S_{11}\Delta C_{11} + S_{33}\Delta C_{33} + S_{55}\Delta C_{55} + S_{66}\Delta C_{66} + S_{13}\Delta C_{13}, \quad (13)$$

where $\Delta C_{11}$, $\Delta C_{33}$, $\Delta C_{55}$, $\Delta C_{66}$, and $\Delta C_{13}$ denote changes in the five effective TI-constants from a chosen isotropic reference state.

The effective TI-constants are referred to the measurement axes defined by the flexural wave propagation direction along the $X_3$-axis, and the shear polarization direction parallel to the $X_1$-direction. Inversion of the fast flexural dispersion provides estimates of $C_{55}$, $C_{66}$, and $C_{13}$. The monopole compressional headwave slowness can be processed to yield the elastic constant $C_{33}$. Generally, it is not possible to invert for the elastic constant $C_{11}$ from the dipole dispersion because of rather small sensitivity and in the presence of noise in the field data.

Certain depth intervals dominated by sandstone or limestone placed between thicker intervals of TIV shale-gas formations exhibit dipole shear wave splitting and dipole dispersion crossovers implying azimuthal stress induced anisotropy ($\sigma_{Hmax}$ and $\sigma_{hmin}$ being different) dominating the sonic data. Under this condition, the fast dipole dispersion with shear polarization parallel to the $X_1$-axis can be inverted for the elastic constants $C_{55}$, $C_{66}$, and $C_{13}$ from equation (9).

In addition, the slow dipole dispersion with shear polarization parallel to the $X_2$-axis can be expressed in terms of fractional changes in the flexural wave velocity at a given wavenumber in terms of the changes in the relevant TI-constants from a chosen reference state and corresponding sensitivity coefficients as shown below:

$$\frac{\Delta V}{V} = S_{22}\Delta C_{22} + S_{33}\Delta C_{33} + S_{44}\Delta C_{44} + S_{66}\Delta C_{66} + S_{23}\Delta C_{23}, \quad (14)$$

where the relevant TI-constants are referred to the measurement axes defined by the flexural wave propagation direction along the $X_3$-axis and the shear polarization direction parallel to the $X_2$-direction.

Therefore, inversion of the slow flexural dispersion provides estimates of $C_{44}$, $C_{66}$, and $C_{23}$. The monopole compressional headwave slowness can be processed to yield the elastic constant $C_{33}$. Stoneley dispersion can also be inverted to yield the elastic constant $C_{66}$. Such depth intervals that exhibit crossing dipole dispersions in a vertical pilot wellbore parallel to the $X_3$-axis are characterized by orthorhombic anisotropy where $C_{44} \neq C_{55}$ and $C_{13} \neq C_{23}$.

[Horizontal well parallel to the $X_1$-axis] Generally, a lateral producing wellbore is drilled parallel to the minimum or maximum horizontal stress direction. Herein, it is assumed that the lateral well is parallel to the $X_1$-axis and the fast dipole transmitter is aligned with the $X_2$-axis. Fractional changes in the fast flexural dispersion can then be expressed in terms of changes in effective TI-elastic constants as:

$$\frac{\Delta V}{V} = S_{11}\Delta C_{11} + S_{33}\Delta C_{33} + S_{44}\Delta C_{44} + S_{66}\Delta C_{66} + S_{13}\Delta C_{13}, \qquad (15)$$

where the effective TI-constants are referred to the measurement axes defined by the flexural wave propagation direction along the $X_1$-axis and the shear polarization direction parallel to the $X_2$-direction. In this case, the method can invert for $C_{66}$, $C_{44}$, and $C_{13}$. The compressional headwave velocity yields the elastic constant $C_{11}$.

If the lateral well is parallel to the $X_1$-axis and the slow dipole transmitter is aligned with the $X_3$-axis, fractional changes in the slow flexural dispersion can be expressed in terms of changes in effective TI-elastic constants as:

$$\frac{\Delta V}{V} = S_{11}\Delta C_{11} + S_{33}\Delta C_{33} + S_{55}\Delta C_{55} + S_{66}\Delta C_{66} + S_{23}\Delta C_{23}, \qquad (16)$$

where the method can now invert for $C_{55}$ and $C_{23}$, and the effective TI-constants are now referred to the measurement axes defined by the flexural wave propagation direction along the $X_1$-axis, and the shear polarization direction parallel to the $X_3$-direction. The compressional headwave velocity yields the elastic constant $C_{11}$. Since sensitivities to other elastic constants are rather small and the measured dispersion has some errors, those elastic constants cannot be reliably inverted.

Inversion of the fast flexural dispersion provides estimates of $C_{66}$, $C_{44}$, and $C_{13}$, whereas the slow flexural dispersion yields $C_{55}$ and $C_{23}$. The monopole compressional headwave slowness can be processed to yield the elastic constant $C_{11}$. Stoneley dispersion can be inverted to yield the elastic constant $C_{44}$.

[Horizontal well parallel to the $X_2$-axis] Herein, it is assumed that the lateral well is parallel to the $X_2$-axis and the fast dipole transmitter is aligned with the $X_1$-axis. Fractional changes in the fast flexural dispersion can then be expressed as $$\frac{\Delta V}{V} = S_{22}\Delta C_{22} + S_{33}\Delta C_{33} + S_{55}\Delta C_{55} + S_{66}\Delta C_{66} + S_{23}\Delta C_{23}, \qquad (17)$$

where the method can invert for $C_{66}$, $C_{55}$, and $C_{23}$. The compressional headwave velocity yields the elastic constant $C_{22}$.

If the lateral well is parallel to the $X_2$-axis and the slow dipole transmitter is aligned with the $X_3$-axis, fractional changes in the slow flexural dispersion can then be expressed as:

$$\frac{\Delta V}{V} = S_{22}\Delta C_{22} + S_{33}\Delta C_{33} + S_{44}\Delta C_{44} + S_{66}\Delta C_{66} + S_{13}\Delta C_{13}, \qquad (18)$$

where the method can invert for $C_{44}$ and $C_{13}$. The compressional headwave velocity yields the elastic constant $C_{22}$. A Stoneley dispersion can be inverted to yield the elastic constant $C_{55}$.

Inversion of the fast flexural dispersion provides estimates of $C_{66}$, $C_{55}$, and $C_{23}$, whereas the slow flexural dispersion yields $C_{44}$ and $C_{13}$. The monopole compressional headwave slowness can be processed to yield the elastic constant $C_{22}$. Stoneley dispersion can be inverted to yield the elastic constant $C_{55}$.

[Inversion of wellbore dispersions for multiple anisotropic constants] Fractional changes in a wellbore mode velocity at a given wavenumber $k_i$ or equivalently, frequency $f_i$ can be expressed as:

$$\frac{\Delta V_i}{V_i} = S_{11}^i \Delta C_{11} + S_{33}^i \Delta C_{33} + S_{44}^i \Delta C_{44} + S_{66}^i \Delta C_{66} + S_{13}^i \Delta C_{13}, \qquad (19)$$

where the normalized sensitivity to anisotropic elastic constants $C_{pq}$ in the chosen reference state is given by:

$$S_{pq}^i = \frac{\Delta V_i}{V_i}\left(\frac{C_{pq}^{ref}}{\Delta C_{pq}}\right), \qquad (20)$$

where the index i denotes the sensitivity at a given axial wavenumber $k_i$.

Therefore, the actual velocity at a given wavenumber is thus expressed as:

$$V = V_{ref} + V_{ref}(S_{11}\Delta C_{11} + S_{33}\Delta C_{33} + S_{44}\Delta C_{44} + S_{66}\Delta C_{66} + S_{13}\Delta C_{13}), \qquad (21)$$

The corresponding frequency f for the perturbed velocity V is then given by:

$$k = \frac{\omega^{ref}}{V^{ref}} = \frac{\omega}{V}, \qquad (22)$$

$$f = \frac{kV}{2\pi}.$$

Multiple velocity-frequency data can be used to solve for the five independent TI-constants from the following linear matrix equation:

$$\begin{bmatrix} S_{11}^1 & S_{33}^1 & S_{44}^1 & S_{66}^1 & S_{13}^1 \\ S_{11}^2 & S_{33}^2 & S_{44}^2 & S_{66}^2 & S_{13}^2 \\ S_{11}^3 & S_{33}^3 & S_{44}^3 & S_{66}^3 & S_{13}^3 \\ S_{11}^4 & S_{33}^4 & S_{44}^4 & S_{66}^4 & S_{13}^4 \\ S_{11}^5 & S_{33}^5 & S_{44}^5 & S_{66}^5 & S_{13}^5 \end{bmatrix} \begin{bmatrix} \Delta C_{11} \\ \Delta C_{33} \\ \Delta C_{44} \\ \Delta C_{66} \\ \Delta C_{13} \end{bmatrix} = \begin{bmatrix} \frac{\Delta V_1}{V_1} \\ \frac{\Delta V_2}{V_2} \\ \frac{\Delta V_3}{V_3} \\ \frac{\Delta V_4}{V_4} \\ \frac{\Delta V_5}{V_5} \end{bmatrix}. \qquad (23)$$

However, inverting for all five TI-constants from a single modal dispersion is a formidable task. Accurate input velocity-frequency data generated synthetically from a root-finding mode-search routine would reliably yield all of the five TI-constants including a few constants with rather small sensitivities to the modal dispersion data. However, when sensitivities to some of the TI-constants are small, it can cause the inversion to be ill-conditioned for a bandlimited measured dispersion obtained from a commercial tool that is prone to some errors. The magnitude and frequency dependence of sensitivity functions provide useful guidelines to select optimal bandwidths for possible inversion of a single or a few TI-elastic constants.

Rewriting equation (21), at a given wavenumber $k_i$, or equivalently, frequency $f_i$, $$\frac{\Delta V_i}{V_i} = s_{ij} \Delta c_j, \qquad (24)$$

where $\Delta c_1 = \Delta C_{11}$, $\Delta c_2 = \Delta C_{33}$, $\Delta c_3 = \Delta C_{44}$, $\Delta c_4 = \Delta C_{66}$, and $\Delta c_5 = \Delta C_{13}$; $s_{ij}$ denotes sensitivity to $\Delta c_j$ at wavenumber $k_i$; and $j = 1, 2, 3, 4$, and 5, corresponding to the five independent TI-constants. Assuming that there are $i$ measured fractional velocity changes $\Delta V_i/V_i$ from a chosen reference state, the best estimate of TI-elastic constants without any constraints for a Gaussian random process based on a least-square minimization algorithm is given by:

$$\Delta c_j = \frac{s_{ji}}{(s_{ji} s_{ji})} \frac{\Delta V_i}{V_i}. \qquad (25)$$

Assuming the sensitivity to $C_{66}$ to be significantly larger than any other elastic constants over a select bandwidth, the method can solve for $\Delta C_{66}$ using n data for the fractional changes in the phase velocity over a chosen bandwidth from the following equation:

$$\Delta c_4 (= \Delta C_{66}) = \frac{\sum_{i=1}^{n} s_{4i} \frac{\Delta V_i}{V_i}}{\sum_{i=1}^{n} (s_{4i})^2}, \qquad (26)$$

where the index n denotes number of velocity-frequency data used in the inversion, and the inverted $C_{66}$ is then given by:

$$C_{66} = \mu + \Delta C_{66}. \qquad (27)$$

The method can now update equation (24):

$$\frac{\Delta V_i}{V_i} - s_{i4} \Delta c_4 = \frac{\Delta W_i}{W_i} = s_{i1} \Delta c_1 + s_{i2} \Delta c_2 + s_{i3} \Delta c_3 + s_{i5} \Delta c_5, \qquad (28)$$

Next, the method inverts for shear modulus $C_{44}$ after updating the input fractional velocity at a given wavenumber by $\Delta W_i/W_i$:

$$\Delta c_3 (= \Delta C_{44}) = \frac{\sum_{i=1}^{n} s_{3i} \frac{\Delta W_i}{W_i}}{\sum_{i=1}^{n} (s_{3i})^2}, \qquad (29)$$

and the inverted $C_{44}$ is then given by:

$$C_{44} = \mu + \Delta C_{44}. \qquad (30)$$

This iterative inversion of elastic constants may be continued until sensitivities of the remaining constants are deemed to be too small for a reliable inversion. Iterative process of estimating multiple TI elastic constants with progressively reduced sensitivities may be terminated when differences between the predicted and measured dipole dispersions become negligibly small.

Next, the method updates equation (28), $$\frac{\Delta V_i}{V_i} - s_{i4} \Delta c_4 - s_{i3} \Delta c_3 = \frac{\Delta X_i}{X_i} = s_{i1} \Delta c_1 + s_{i2} \Delta c_2 + s_{i5} \Delta c_5, \qquad (31)$$

and inverts for another shear modulus $C_{13}$ after updating the input fractional velocity at a given wavenumber by $\Delta X_i/X_i$:

$$\Delta c_5 (= \Delta C_{13}) = \frac{\sum_{i=1}^{n} s_{5i} \frac{\Delta X_i}{X_i}}{\sum_{i=1}^{n} (s_{5i})^2}, \qquad (32)$$

and the inverted $C_{13}$ is then given by:

$$C_{13} = \lambda + \Delta C_{13}. \qquad (33)$$

Next, the method updates equation (31), $$\frac{\Delta V_i}{V_i} - s_{i4} \Delta c_4 - s_{i3} \Delta c_3 - s_{i5} \Delta c_5 = \frac{\Delta Y_i}{Y_i} = s_{i1} \Delta c_1 + s_{i2} \Delta c_2, \qquad (34)$$

and inverts for another shear modulus $C_{13}$ after updating the input fractional velocity at a given wavenumber by $\Delta Y_i/Y_i$:

$$\Delta c_1 (= \Delta C_{11}) = \frac{\sum_{i=1}^{n} s_{1i} \frac{\Delta Y_i}{Y_i}}{\sum_{i=1}^{n} (s_{1i})^2}, \qquad (35)$$

and inverted $C_{11}$ is then given by:

$$C_{11} = \lambda + 2\mu + \Delta C_{11}. \qquad (36)$$

Next, the method updates equation (34):

$$\frac{\Delta V_i}{V_i} - s_{i4} \Delta c_4 - s_{i3} \Delta c_3 - s_{i5} \Delta c_5 - s_{i1} \Delta c_1 = \frac{\Delta Z_i}{Z_i} = s_{i2} \Delta c_2, \qquad (37)$$

and the method inverts for another shear modulus $C_{33}$ after updating the input fractional velocity at a given wavenumber by $\Delta Z_i/Z_i$:

$$\Delta c_2 (= \Delta C_{33}) = \frac{\sum_{i=1}^{n} s_{2i} \frac{\Delta Z_i}{Z_i}}{\sum_{i=1}^{n} (s_{2i})^2}, \qquad (38)$$

and the inverted $C_{33}$ is then given by:

$$C_{33}=\lambda+2\mu+\Delta C_{33}. \quad (39)$$

Accordingly, the method described herein can thus invert for some or all five TI-elastic constants provided there are adequate sensitivities to them over select bandwidths.

Embodiments described herein provide a procedure for estimating multiple TI-constants in a shale gas formation consists. The procedure may comprise the following: use a low-frequency dipole shear slowness together with the compressional slowness to construct an equivalent-isotropic reference dipole dispersion; calculate frequency-dependent sensitivities of the dipole flexural dispersion to the five TI-elastic constants using a volumetric integral equation; and invert differences between this reference and measured dipole dispersions over a chosen bandwidth for a sequence of TI-elastic constants with progressively decreasing sensitivities; and terminate the iterative inversion process when the successive differences between the predicted and measured dipole dispersions together with sensitivities of remaining elastic constants become negligibly small.

An acoustic source in a fluid-filled wellbore may generate headwaves as well as relatively stronger wellbore-guided modes. A standard sonic measurement system may include placing a piezoelectric source and an array of hydrophone receivers inside a fluid-filled wellbore. The piezoelectric source may be configured in the form of either a monopole or a dipole source. The source bandwidth typically ranges from a 0.5 to 20 kHz.

A monopole source may also generate primarily the lowest-order axisymmetric mode, also referred to as the Stoneley mode, together with compressional and shear headwaves. In contrast, a dipole source primarily excites the lowest-order flexural wellbore mode together with compressional and shear headwaves.

The headwaves are caused by the coupling of the transmitted acoustic energy to plane waves in the formation that propagate along the wellbore axis. An incident compressional wave in the wellbore fluid produces critically refracted compressional waves in the formation. Those refracted along the wellbore surface are known as compressional headwaves. The critical incidence angle $\theta_i$ can be expressed by $\theta_i=\sin^{-1}(V_f/V_c)$, where $V_f$ is the compressional wave speed in the wellbore fluid and $V_c$ is the compressional wave speed in the formation. As the compressional headwave travels along the interface, it radiates energy back into the fluid that can be detected by hydrophone receivers placed in the fluid-filled wellbore. In fast formations, the shear headwave can be similarly excited by a compressional wave at the critical incidence angle $\theta_i=\sin^{-1}(V_f/V_s)$, where $V_s$ is the shear wave speed in the formation. It is also worth noting that headwaves are excited only when the wavelength of the incident wave is smaller than the wellbore diameter so that the boundary can be effectively treated as a planar interface.

In a homogeneous and isotropic model of fast formations, as above noted, compressional and shear headwaves may be generated by a monopole source placed in a fluid-filled wellbore for determining the formation compressional and shear wave speeds. It is known that refracted shear headwaves cannot be detected in slow formations (where the shear wave velocity is less than the wellbore-fluid compressional velocity) with receivers placed in the wellbore fluid. In slow formations, formation shear velocities are obtained from the low-frequency asymptote of flexural dispersion. There are standard processing techniques for the estimation of formation shear velocities in either fast or slow formations from an array of recorded dipole waveforms. Low-frequency asymptotes of wellbore flexural dispersions coincide with the far-field formation shear velocities (or slownesses). Cross-dipole waveforms can be processed to obtain the fast and slow flexural dispersions. The fast-shear and slow-shear velocities can be readily converted into shear moduli as described by the following equations:

$$C_{44}=\tau V_{SS}^2,$$

$$C_{55}=\rho V_{FS}^2/ \quad (40)$$

where $\rho$ is the formation mass density; $V_{SS}$ and $V_{FS}$ are the slow and fast shear velocities obtained from the processing of cross-dipole data.

It is noted that low-frequency asymptotes of flexural dispersions are largely independent of the presence of casing and any possible sonic tool effects on dipole data and is also insensitive to mud compressional slowness (DTmud). In addition, monopole waveforms generated by a low-frequency (in the range of 1 to 5 kHz) monopole transmitter can be processed to obtain the wellbore Stoneley dispersions.

Embodiments described herein provide methods to estimate a sub-set of orthorhombic constants from the measured cross-dipole and monopole Stoneley dispersions in a vertical, horizontal, or deviated wellbores from the vertical axis.

Referring generally to the Figures, various illustrations are provided to facilitate an understanding of methods and systems that may be utilized in carrying out the procedure for estimating elastic constants within a subterranean formation. In FIG. 1, for example, a schematic diagram is provided of a pilot vertical wellbore 10 and a lateral wellbore 12 in a transversely-isotropic formation 14 with its symmetry axis parallel to the vertical direction (TIV). As shown in FIG. 1, the vertical pilot wellbore 10 is parallel to the $X_3$-axis and the lateral wellbore 12 is parallel to the $X_1$-axis in the TIV formation 14. In each of the wellbores 10 and 12 including liquid 16, a dipole source 18 and dipole receivers 20 are disposed. Sonic data may be acquired at an array of receivers 20 in a pilot wellbore 10 and processed to estimate a sub-set of TI-elastic constants ($C_{33}$, $C_{44}=C_{55}$, and $C_{66}$) in intervals where the fast and slow dipole flexural dispersions overlay implying azimuthal isotropy in the wellbore cross-sectional $X_1$-$X_2$ plane. The compressional modulus $C_{33}$ may be obtained from the monopole compressional headwave velocity. The dipole shear modulus may be determined from the low-frequency asymptote of the flexural dispersion and can also be estimated from the shear headwave velocity in fast formations. The cross-sectional shear modulus $C_{66}$ may be estimated from the processing of monopole Stoneley waveforms and inverting the Stoneley dispersion using an algorithm that accounts for the sonic tool effects and any possible drilling-induced near-wellbore alteration.

Various embodiments of the present disclosure provide estimates of $C_{13}$ from measured dipole dispersions as a function of vertical measured depth (MD).

Figure 2A:
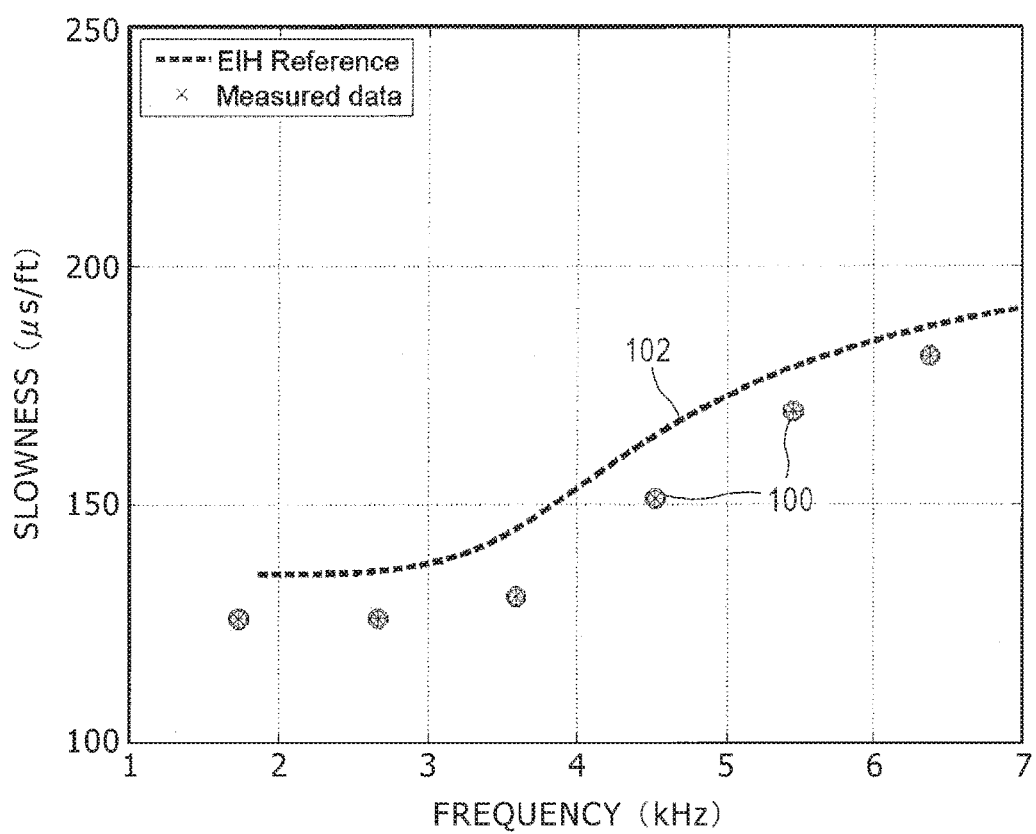
FIG. 2A is a graphical example of a flexural dispersion measured in a vertical well at measured depth A, according to an embodiment of the disclosure.

FIG. 2A shows the measured and reference dipole dispersions at a chosen depth. The markers 100 denote a measured flexural dispersion obtained from the processing of dipole waveforms using a modified matrix pencil algorithm. The dashed line 102 depicts a reference dipole dispersion for an equivalent-isotropic and radially homogeneous (EIH) formation.

Figure 2B:
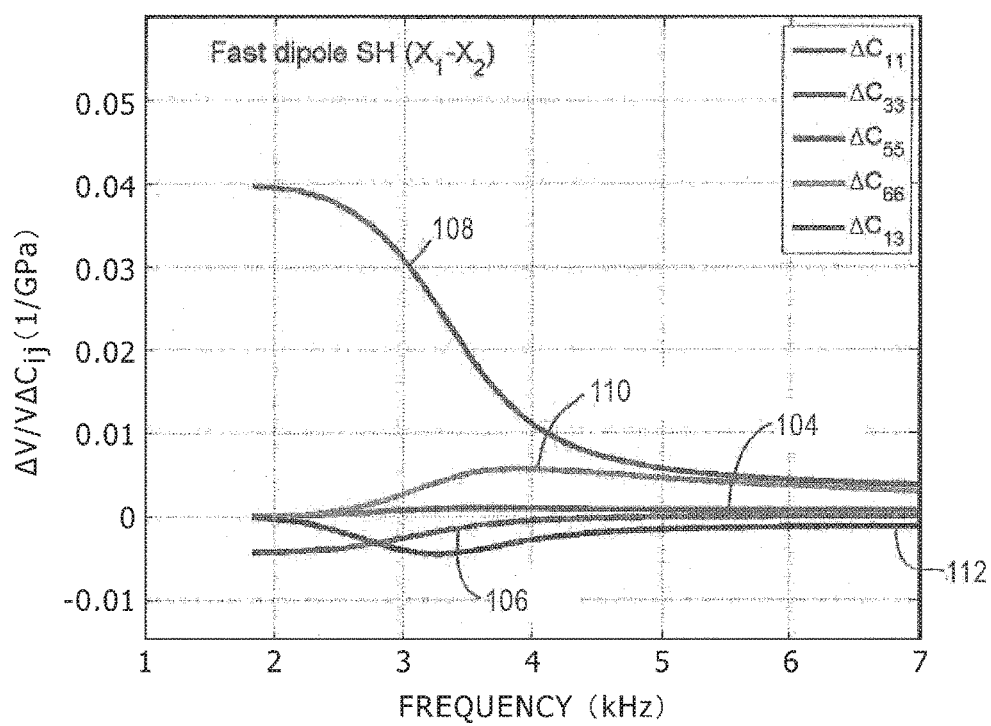
FIG. 2B is a graphical example of fractional changes in flexural velocity due to changes in five transversely-isotropic (TI) elastic constants, according to an embodiment of the disclosure.

FIG. 2B displays sensitivity of the fractional changes in the flexural wave velocity as a function of frequency to 1 GPa change in the five TI-elastic constants. These sensitivity curves 104, 106, 108, 110, and 112 are calculated in the chosen EIH reference state of the formation.

Figure 2C:
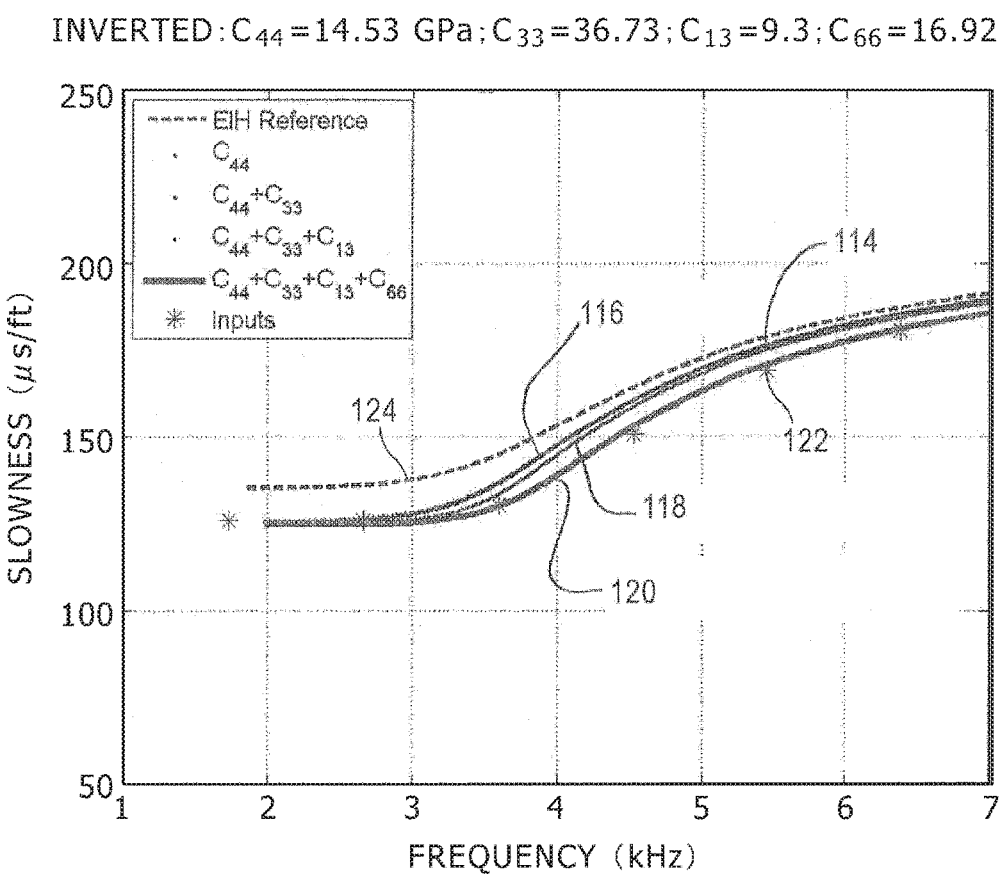
FIG. 2C is a graphical example of reconstructed flexural dispersions using inverted anisotropic constants, according to an embodiment of the disclosure.

FIG. 2C shows several curves including a dashed curve that represents a reference flexural dispersion for a chosen EIH formation. Following the inversion workflow described earlier, the measured dipole dispersion has been inverted for the elastic constants $C_{44}$, $C_{33}$, $C_{13}$ and $C_{66}$. A reconstructed dipole dispersion using the inverted elastic constants agrees well with the input dispersion data 122. The dashed curve 124 depicts a reference flexural dispersion for a chosen EIH formation. The other four curves 114, 116, 118 and 120 denote reconstructed dispersions using inverted anisotropic constants while the solid curve 120 represents the flexural dispersion obtained from inverted $C_{44}$, $C_{33}$, $C_{13}$, and $C_{66}$.

Next, the disclosure describes considering a small vertical section that exhibits crossing dipole dispersions implying azimuthal stress-induced anisotropy dominating the sonic data and that $\sigma_{Hmax} = \sigma_{hmin}$.

Figure 3A:
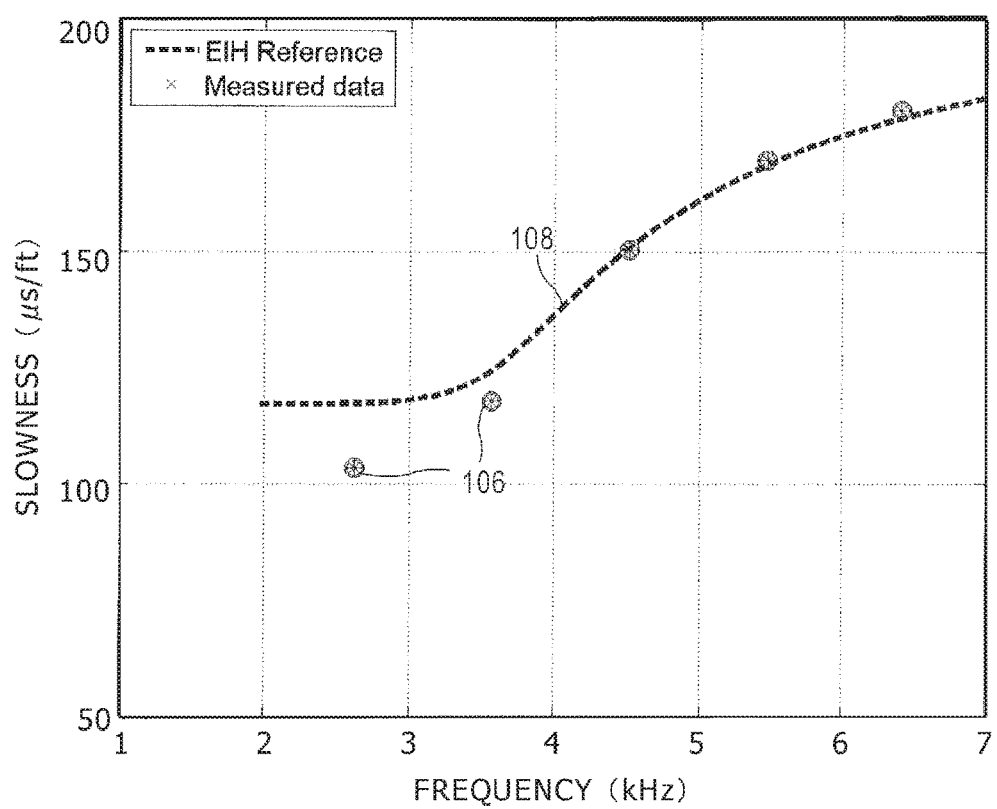
FIG. 3A is a graphical example of a flexural dispersion measured in a vertical well at measured depth B, according to an embodiment of the disclosure.

FIG. 3A shows a measured fast dipole dispersion by discrete markers 106 and a reference dispersion for a chosen reference EIH formation by the dashed curve 108. The discrete markers 108 show a measured fast dipole dispersion from a commercial sonic tool in a vertical well.

Figure 3B:
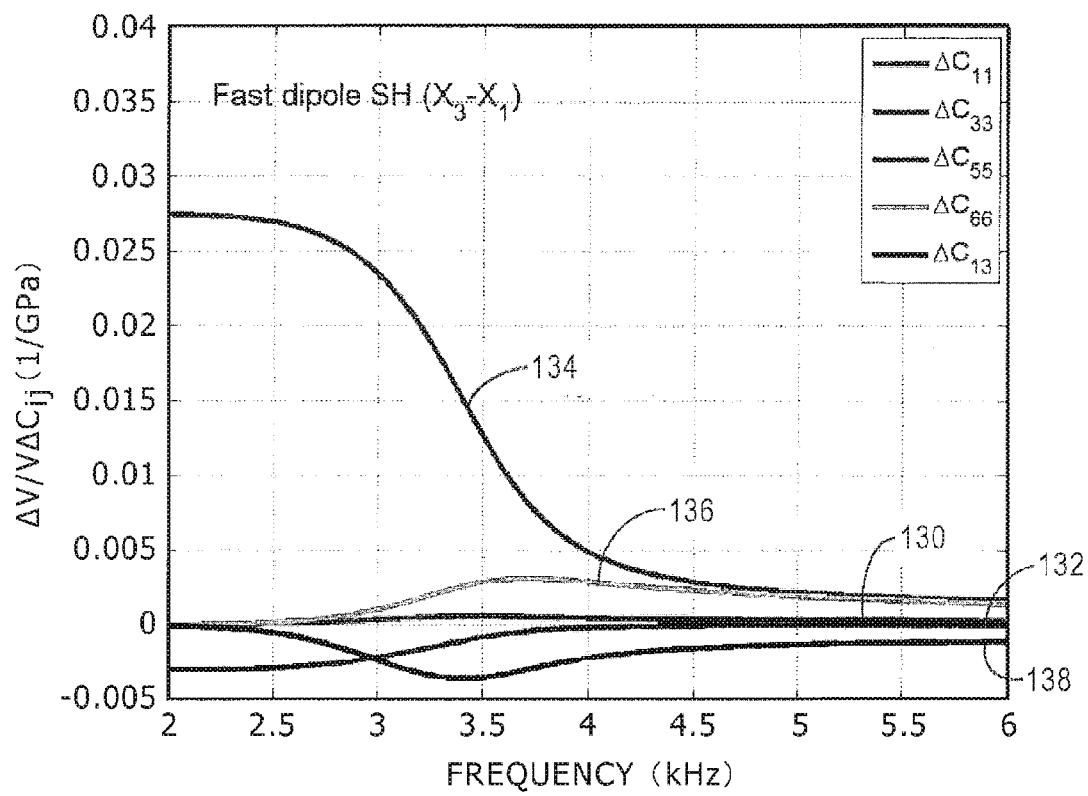
FIG. 3B is a graphical example of fractional changes in flexural velocity due to changes in the five TI-elastic constants, according to an embodiment of the disclosure.

FIG. 3B shows calculated sensitivities of the fast dipole flexural velocities to 1 GPa change in the five effective TI-constants $C_{11}$, $C_{33}$, $C_{55}$, $C_{66}$, and $C_{13}$ referred to the measurement axes. These sensitivity curves 130, 132, 134, 136, and 138 are calculated in an EIH reference state chosen close to the measured fast dipole flexural dispersion. The measurement axes refers to the $X_3$- and $X_1$-directions to represent the propagation and fast-shear polarization directions, respectively.

Figure 3C:
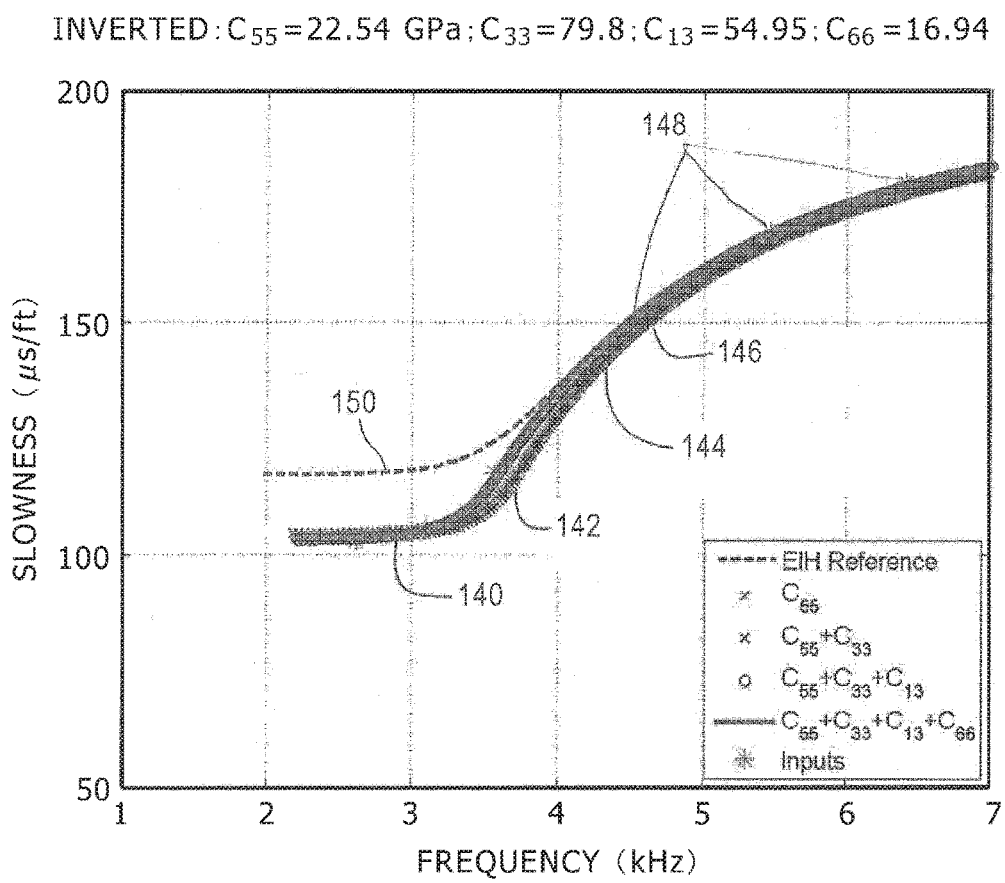
FIG. 3C is a graphical example of reconstructed flexural dispersions using inverted anisotropic constants, according to an embodiment of the disclosure.

FIG. 3C shows reconstructed flexural dispersions using inverted anisotropic constants. The dashed curve 150 represents a reference flexural dispersion for a chosen EIH formation and four other curves 140, 142, 144, and 146 denote reconstructed dispersions using inverted anisotropic constants. The solid curve 146 represents the flexural dispersion obtained from the inverted $C_{55}$, $C_{33}$, $C_{13}$, and $C_{66}$ together with the measured dispersion denoted by crosses 148. When comparing the reconstructed fast dipole flexural dispersion using the inverted TI-constants $C_{55}$, $C_{33}$, $C_{13}$, and $C_{66}$ with the measured dispersion in FIG. 3C, good agreement between the reconstructed and measured dispersions demonstrates validity of the inversion algorithm.

Figure 4A:
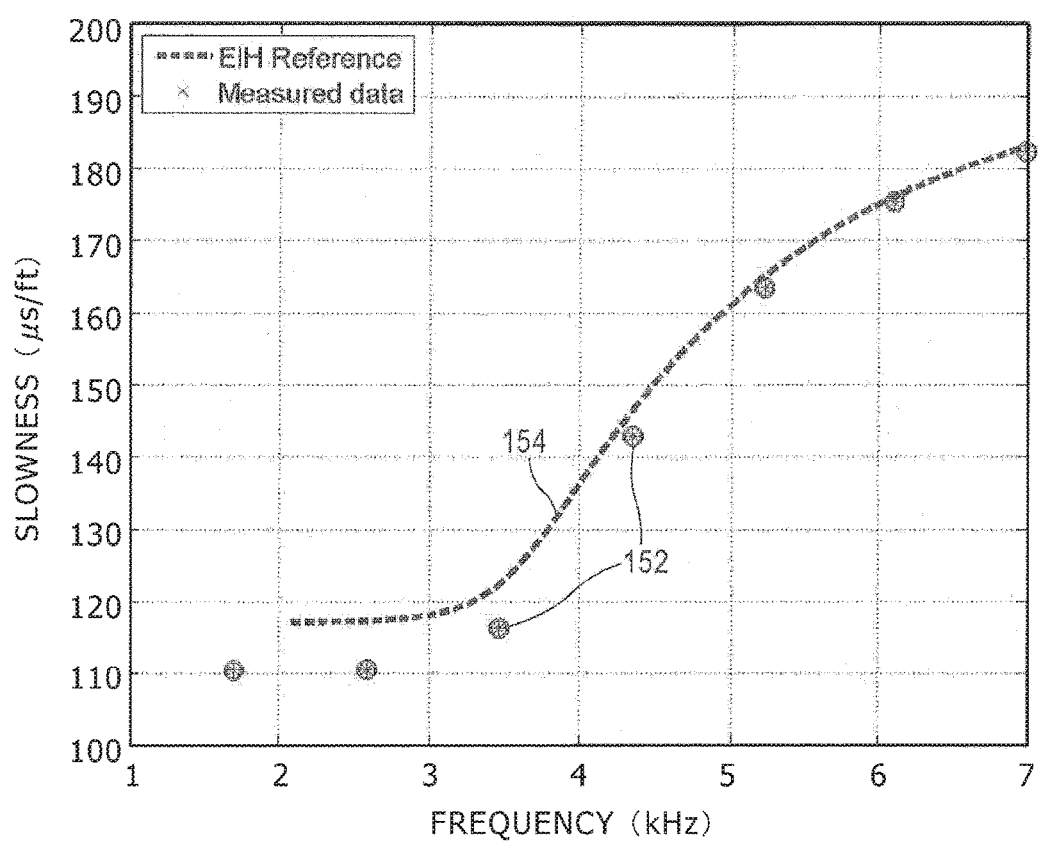
FIG. 4A is a graphical example of a flexural dispersion measured in a vertical well at measured depth B, according to an embodiment of the disclosure.
Figure 4B:
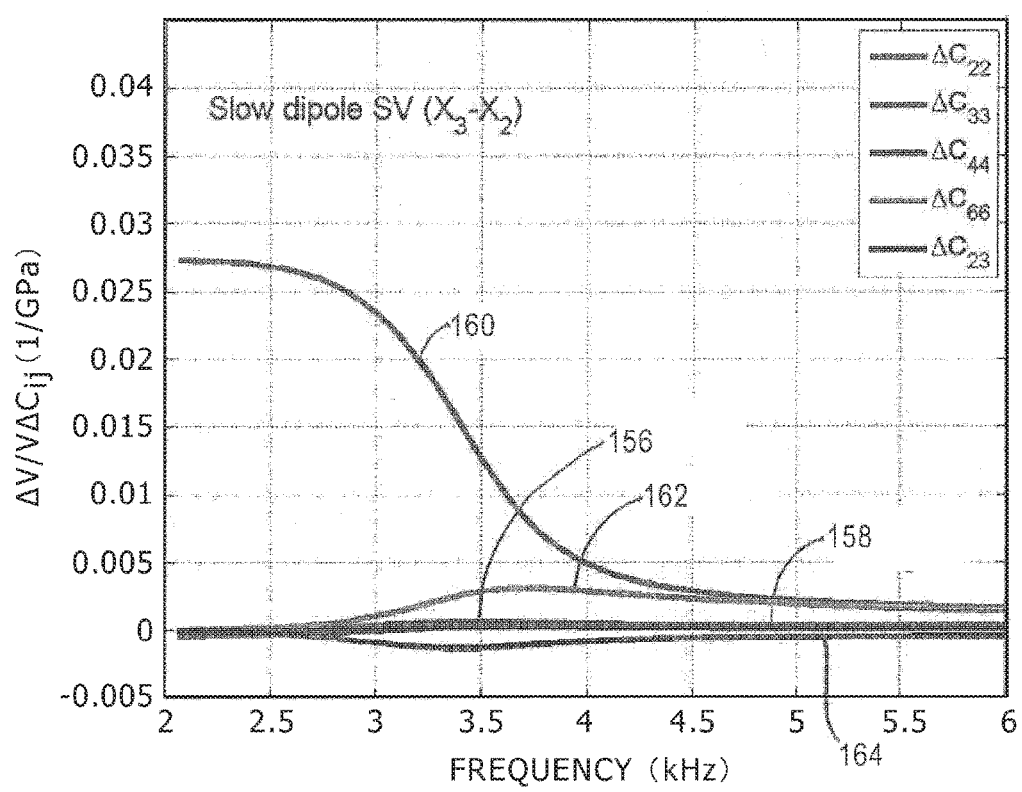
FIG. 4B is a graphical example of fractional changes in flexural velocity due to changes in the five TI-elastic constants, according to an embodiment of the disclosure.
Figure 4C:
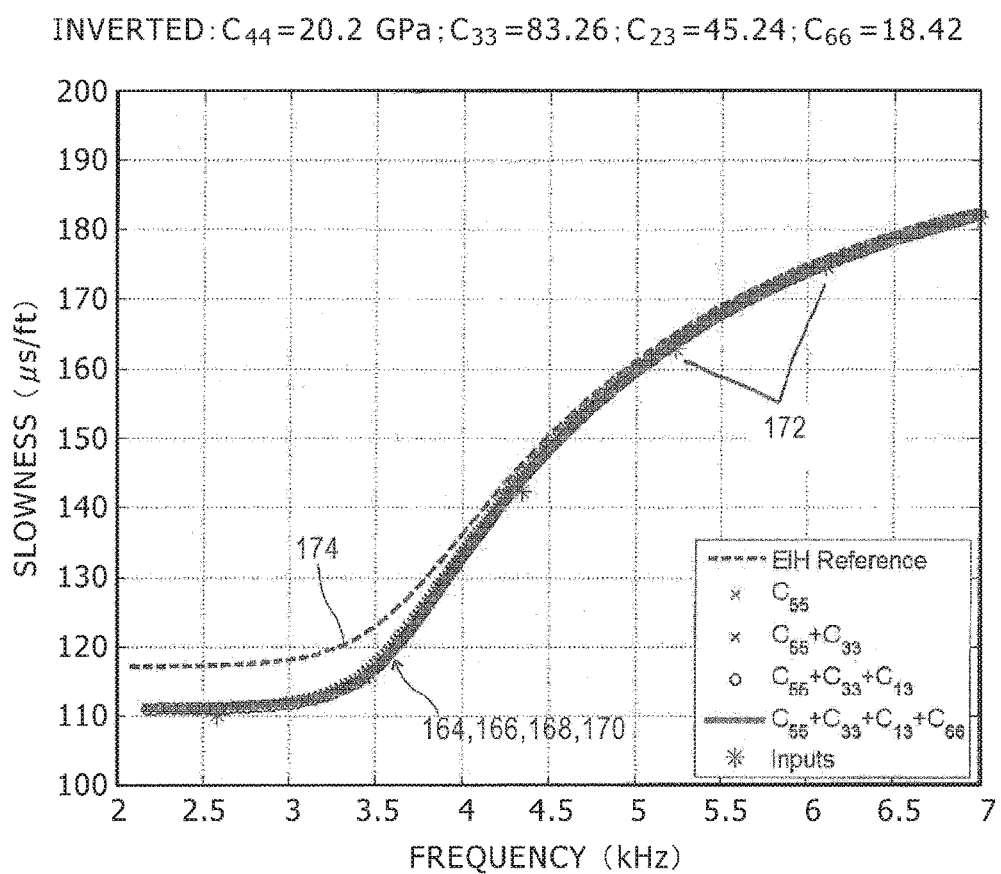
FIG. 4C is a graphical example of reconstructed flexural dispersions using inverted anisotropic constants, according to an embodiment of the disclosure.

Likewise, results from analyses of the slow dipole flexural dispersion are displayed in FIGS. 4A, 4B, and 4C, respectively, with the same notation as used in FIGS. 3A, 3B, and 3C.

FIG. 4A shows a measured slow dipole dispersion by discrete markers 152 and a reference dispersion for a chosen reference EIH formation by the dashed curve 154. The discrete markers 152 show a measured slow dipole dispersion from a commercial sonic tool in a vertical well.

FIG. 4B shows calculated sensitivities of the slow dipole flexural velocities to 1 GPa change in the five effective TI-constants $C_{22}$, $C_{33}$, $C_{44}$, $C_{66}$, and $C_{23}$ referred to the measurement axes. These sensitivity curves 156, 158, 158, 160, 162, and 164 are calculated in an EIH reference state chosen close to the measured dipole flexural dispersion. It is noticed that the slow dipole dispersion sensitivity to the effective TI-elastic constants $C_{22}$, $C_{33}$, $C_{44}$, $C_{66}$, and $C_{23}$ referred to the measurement axes are somewhat different than those displayed in FIG. 3B. The measurement axes in this case is defined by the $X_3$- and $X_2$-directions to represent the propagation and slow-shear polarization directions, respectively. Moreover, it is noticed that sensitivities to the elastic constant $C_{33}$ is significantly reduced and to the off-diagonal element $C_{23}$ is also somewhat less than the corresponding TI-constants shown in FIG. 3B. However, with a proper selection of slowness-frequency data, it is possible to obtain reliable results for $C_{44}$, $C_{33}$, $C_{23}$, and $C_{66}$.

FIG. 4C shows reconstructed flexural dispersions using inverted anisotropic constants. The dashed curve 174 represents a reference flexural dispersion for a chosen EIH formation and four other curves 164, 166, 168, and 170 denote reconstructed dispersions using inverted anisotropic constants. The solid curve 170 represents the flexural dispersion obtained from the inverted $C_{55}$, $C_{33}$, $C_{23}$, and $C_{66}$ together with the measured dispersion denoted by crosses 172.

Next, the disclosure describes analyzing cross-dipole sonic data from a horizontal section. When the flexural wave propagation is parallel to the $X_1$-direction, there is a significant anisotropy in the wellbore cross-sectional $X_2$-$X_3$ plane and shear wave splitting corresponds to measurements of a fast and slow dipole dispersions.

Figure 5A:
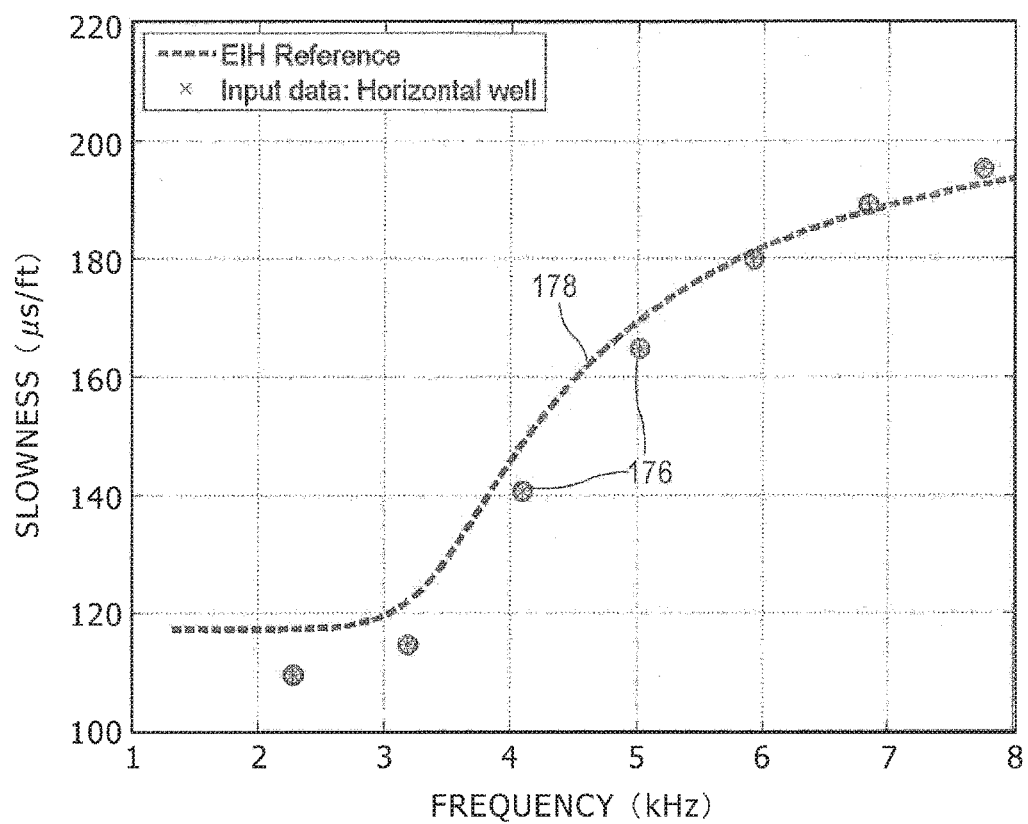
FIG. 5A is a graphical example of a flexural dispersion measured in a horizontal producer well at measured depth C, according to an embodiment of the disclosure.
Figure 5B:
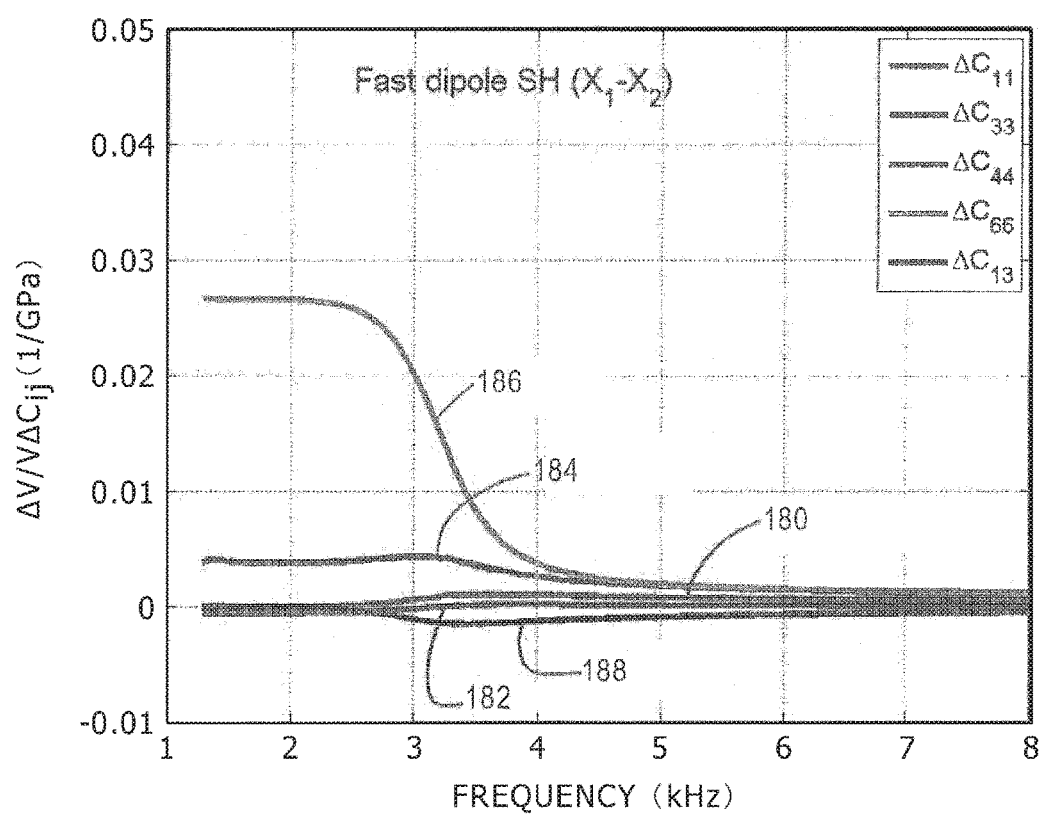
FIG. 5B is a graphical example of fractional changes in flexural velocity due to changes in the five TI-elastic constants, according to an embodiment of the disclosure.

FIG. 5A shows a measured fast dipole dispersion by discrete markers 176 and a reference dispersion for a chosen reference EIH formation by the dashed curve 178. The discrete markers 176 show a measured fast dipole dispersion from a commercial sonic tool at measured depth C in a horizontal producer well. [0108] FIG. 5B shows calculated sensitivities of the fast dipole flexural velocities to 1 GPa change in the five effective TI-constants $C_{11}$, $C_{33}$, $C_{44}$, $C_{66}$, and $C_{13}$ referred to the measurement axes. These sensitivity curves 180, 182, 184, 186, and 188 are calculated in an EIH reference state chosen close to the measured fast dipole flexural dispersion. The measurement axes in this case refer to the propagation along the $X_1$-direction and fast-shear polarization along the $X_2$-direction, respectively. Inversion of the fast-dipole dispersion yields the effective TI-constants $C_{66}$, $C_{44}$, and $C_{13}$. The elastic constant $C_{11}$ can be directly obtained from the compressional velocity along the flexural wave propagation direction.

Figure 5C:
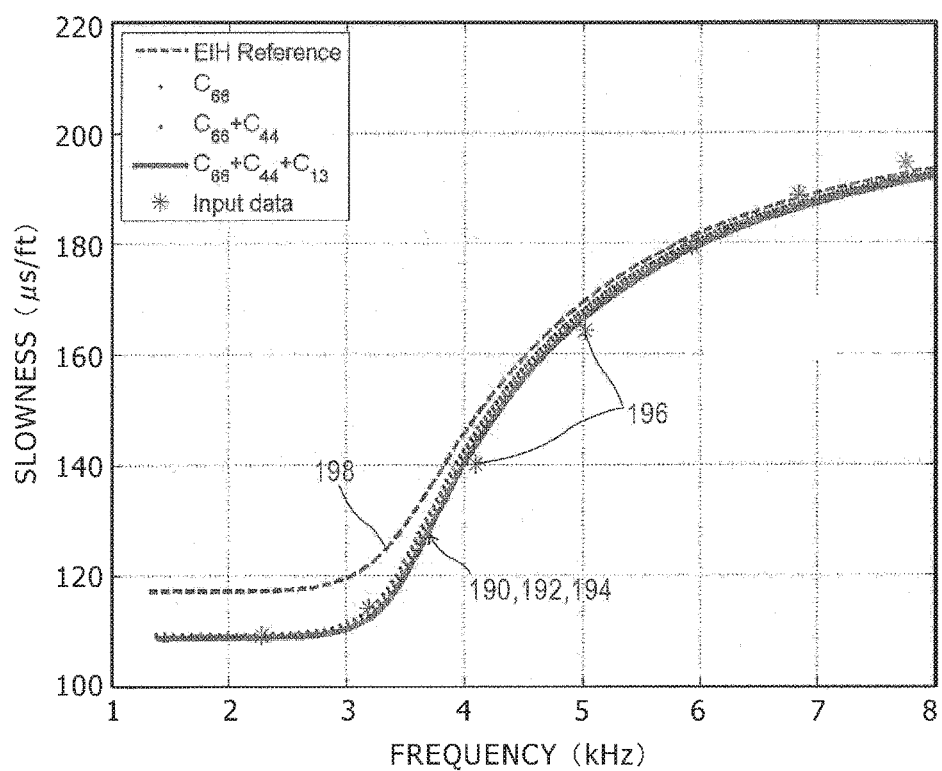
FIG. 5C is a graphical example of reconstructed flexural dispersions using inverted anisotropic constants, according to an embodiment of the disclosure.

FIG. 5C shows reconstructed flexural dispersions using inverted anisotropic constants. The dashed curve 198 represents a reference flexural dispersion for a chosen EIH formation and three other curves 190, 192 and 194 denote reconstructed dispersions using inverted anisotropic constants. The solid curve 194 represents the flexural dispersion obtained from the inverted $C_{44}$, $C_{13}$, and $C_{66}$ together with the measured dispersion denoted by crosses 196.

In contrast, when the slow-shear polarization direction is along the $X_3$-direction and the propagation direction along the $X_1$-direction, the (low-frequency) slow dipole dispersion corresponds to the shear modulus $C_{55}$ in the wellbore cross-sectional plane.

Figure 6A:
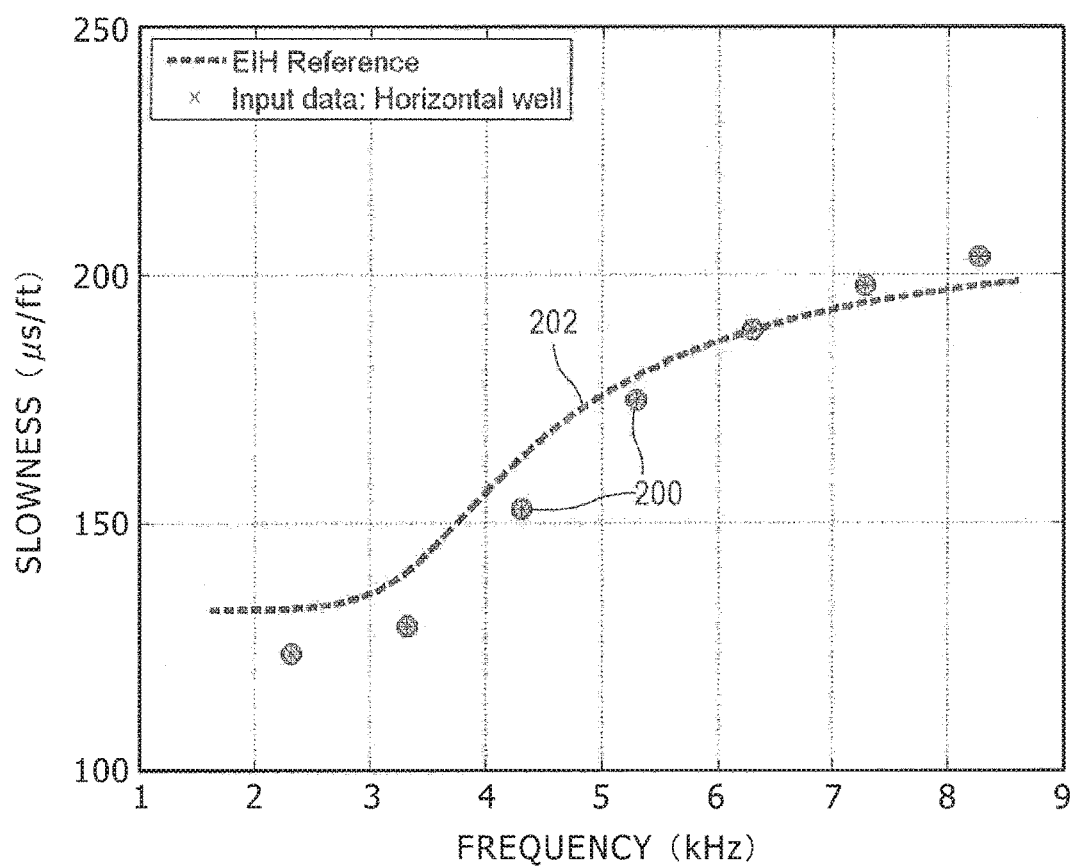
FIG. 6A is a graphical example of a flexural dispersion measured in a horizontal producer well, according to an embodiment of the disclosure.
Figure 6B:
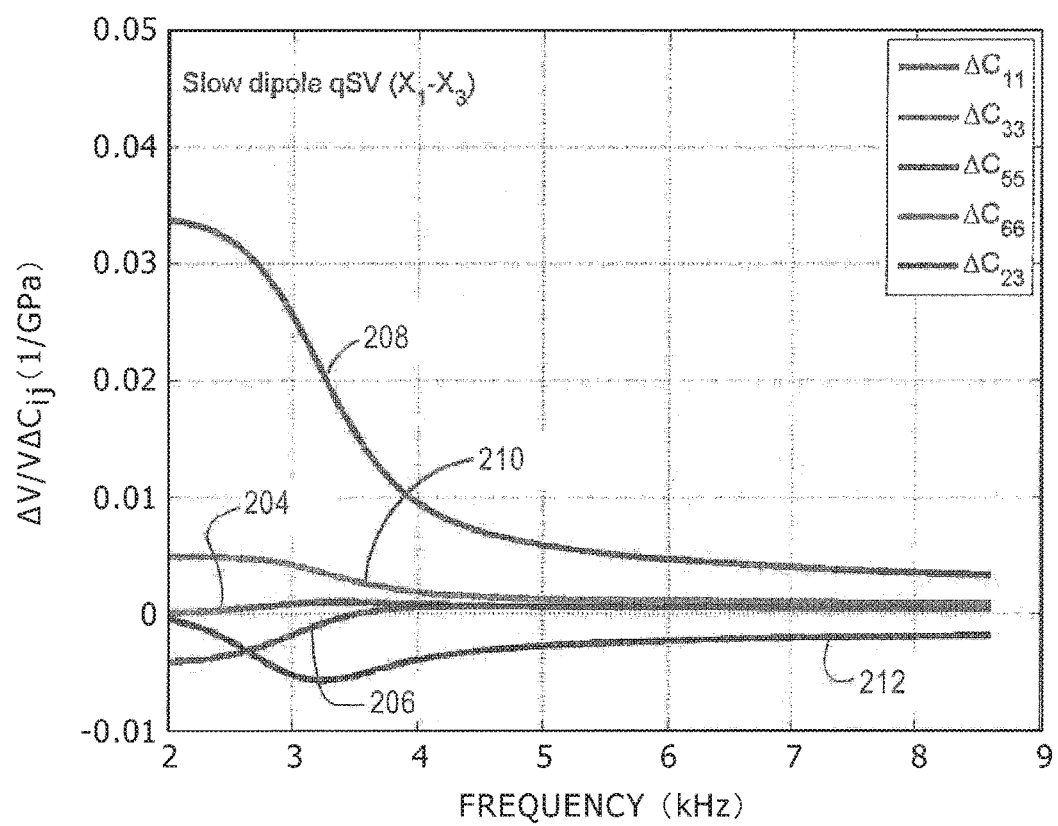
FIG. 6B a graphical example of fractional changes in flexural velocity due to changes in the five TI-elastic constants, according to an embodiment of the disclosure.

FIG. 6A shows a measured slow dipole dispersion by discrete markers 200 and a reference dispersion for a chosen reference EIH formation by the dashed curve 202. The discrete markers 200 show a measured slow dipole dispersion from a commercial sonic tool at measured depth C in a horizontal producer well. [0112] FIG. 6B shows calculated sensitivities of the slow dipole flexural velocities to 1 GPa change in the five effective TI-constants $C_{11}$, $C_{33}$, $C_{55}$, $C_{66}$, and $C_{23}$ referred to the measurement axes. These sensitivity curves 204, 206, 208, 210, and 212 are calculated in an EIH reference state chosen close to the measured slow dipole flexural dispersion. The measurement axes in this case refer to the propagation along the $X_1$-direction and fast-shear polarization along the $X_3$-direction, respectively.

Figure 6C:
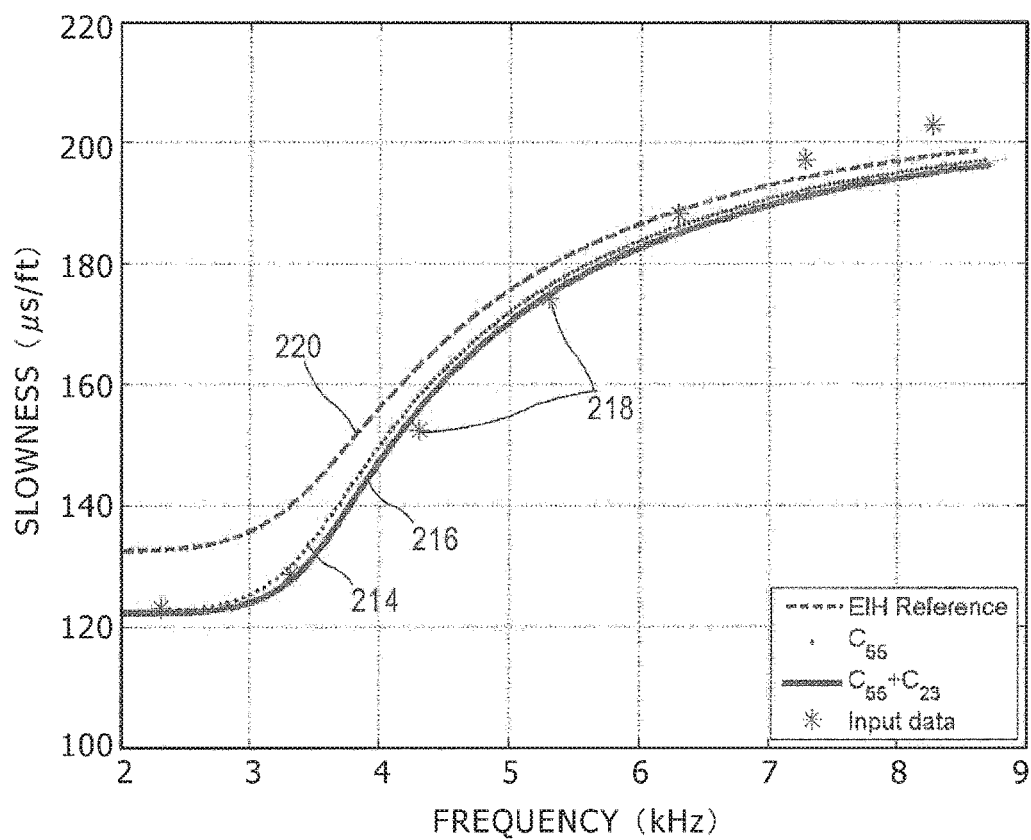
FIG. 6C is a graphical example of reconstructed flexural dispersions using inverted anisotropic constants, according to an embodiment of the disclosure.

FIG. 6C shows reconstructed flexural dispersions using inverted anisotropic constants. The dashed curve 220 represents a reference flexural dispersion for a chosen EIH formation and two other curves 214 and 216 denote reconstructed dispersions using inverted anisotropic constants. The solid curve 216 represents the flexural dispersion obtained from the inverted $C_{55}$ and $C_{23}$ together with the measured dispersion denoted by crosses 218.

Results for the inverted TI-constants from the fast-dipole flexural dispersion include estimates of $C_{66}$, $C_{44}$, $C_{13}$, and $C_{11}$ (from the compressional velocity along the $X_1$-direction). Invoking a known correlation between the Thomsen parameters $\gamma$ and $\varepsilon$, the fifth TI-constant $C_{33}$ can be obtained from the following equations:

$$C_{33} = C_{11}/(1+2\gamma),$$

$$\gamma(C_{66}-C_{55})/2C_{55}, \varepsilon=(C_{11}-C_{33})/2C_{33}. \quad (41)$$

At this point, the five TI-constants are estimated over the active volume probed by the fast-dipole flexural waves. These constants can be transformed into rock mechanical properties defined by the two Young's moduli ($Y_{ij}$) and three Poisson's ratios ($v_{ij}$). They are related to the elastic moduli ($C_{ij}$) as shown in the following equations:

$$Y_{33} = C_{33} - \frac{2C_{13}^2}{C_{11}+C_{12}}, \quad (42)$$

$$Y_{11} = C_{11} + \frac{C_{13}^2(-C_{11}+C_{12})+C_{12}(-C_{33}C_{12}+C_{13}^2)}{C_{11}C_{33}-C_{13}^2} \quad (43)$$

$$v_{31} = v_{32} = \frac{C_{13}}{C_{11}+C_{12}} \quad (44)$$

$$v_{13} = \frac{C_{13}(C_{11}-C_{12})}{C_{33}C_{11}-C_{13}^2}, \quad (45)$$

$$v_{12} = \frac{C_{33}C_{12}-C_{13}^2}{C_{33}C_{11}-C_{13}^2}, \quad (46)$$

where according to convention, in $v_{ij}$, the first index i refers to the direction of the applied stress and the second index j denotes the contraction or expansion direction. It is noted that the following relations also hold for transversely isotropic materials:

$$v_{23} = v_{13}, \quad (47)$$

$$v_{21} = v_{12}, \quad (48)$$

$$v_{31} \neq v_{13}, \quad (49)$$

$$\frac{v_{31}}{Y_{33}} = \frac{v_{13}}{Y_{11}}. \quad (50)$$

Since the shear modulus $C_{55}$ in the vertical plane $X_1$-$X_3$ can be different than the shear modulus $C_{44}$ in the vertical plane $X_2$-$X_3$, the method can estimate another set of effective TI-constants $C_{66}$, $C_{55}$, $C_{23}$, and $C_{22}$ (from the compressional velocity along the $X_2$-direction). Differences between these two sets of TI-constants can occur because of the three different principal stresses ($\sigma_V \neq \sigma_H \neq \sigma_h$) that would render the formation to that of orthorhombic anisotropy. The corresponding Young's moduli $Y_{22}$, $Y_{33}$, and Poisson's ratios $v_{23}$, $v_{32}$, and $v_{12}$ can be obtained from equations (31)-(36) after replacing the index 1 by 2.

[Maximum and minimum horizontal stresses] A triaxially stressed formation with the three different principal stresses ($\sigma_V \neq \sigma_X \neq \sigma_h$) exhibits orthorhombic anisotropy. Once the method has estimated a sub-set of orthorhombic constants $C_{11}$, $C_{33}$, $C_{13}$, $C_{23}$, and $C_{66}$, the effective minimum and maximum horizontal stresses along the $X_1$- and $X_2$-directions, respectively, can be estimated from the following poroelastic stress equations $$\sigma_h - \alpha_h P_p = \quad (51)$$
$$\frac{C_{13}}{C_{33}}(\sigma_V - \alpha_V P_p) + \left(C_{11} - \frac{C_{13}C_{13}}{C_{33}}\right)\varepsilon_h + \left(C_{12} - \frac{C_{13}C_{23}}{C_{33}}\right)\varepsilon_H,$$

$$\sigma_H - \alpha_H P_p = \quad (52)$$
$$\frac{C_{23}}{C_{33}}(\sigma_V - \alpha_V P_p) + \left(C_{12} - \frac{C_{13}C_{23}}{C_{33}}\right)\varepsilon_h + \left(C_{22} - \frac{C_{23}^2}{C_{33}}\right)\varepsilon_H,$$

where $\alpha_h$, $\alpha_H$, and $\alpha_V$ denote the Biot coefficients along the minimum horizontal, maximum horizontal, and vertical directions, respectively; $P_P$ is the pore pressure; and $\varepsilon_h$ and $\varepsilon_H$ are the tectonic strains. In the case of a relaxed basin, both of these tectonic strains can be set equal to zero. It is clear from equations (51) and (52) that differences between ratios $C_{13}/C_{33}$ and $C_{23}/C_{33}$ as a function of logging depth can be a proxy for the differences between the minimum and maximum horizontal stresses.

In addition, if $C_{23} > C_{13}$, and $C_{44} > C_{55}$, the minimum horizontal stress is parallel to the $X_1$-direction and maximum horizontal stress GET is parallel to the $X_2$-direction. In contrast, if $C_{13} > C_{23}$, and $C_{55} > C_{44}$, the minimum horizontal stress is parallel to the $X_2$-direction, and maximum horizontal stress $\sigma_H$ is parallel to the $X_1$-direction.

When the wellbore sonic data acquired from a vertical pilot well parallel to the $X_3$-direction is processed at multiple depths, the method can obtain variations of a subset of orthorhombic or TI-constants as a function of vertical depth.

Figure 7A:
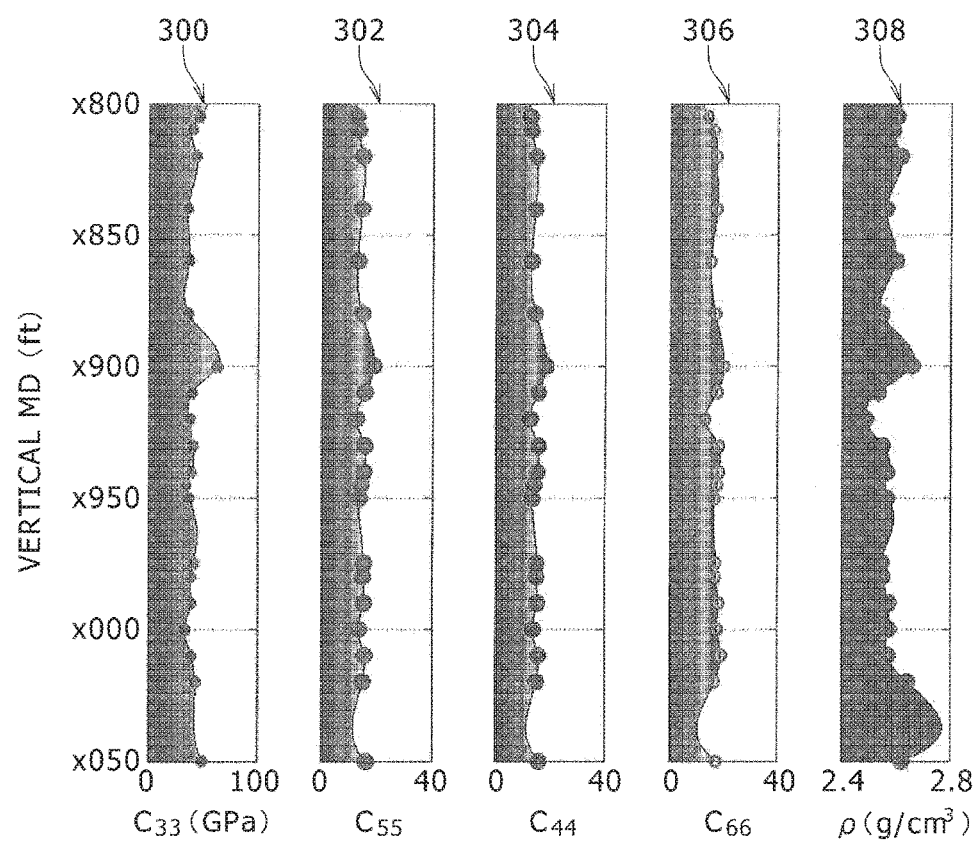
FIG. 7A is a graphical example of logs of elastic constants and formation bulk density measured in a vertical well, according to an embodiment of the disclosure.

FIGS. 7A-7D are graphical examples of logs measured in a vertical well. FIG. 7A displays variations in the elastic constants $C_{33}$, $C_{55}$, $C_{44}$, $C_{66}$, and formation bulk density $\rho$, which are plotted as a function of measured depth. In FIG. 7A, the first track 300 shows $C_{33}$ estimated from compressional slowness (DTc), the second track 302 displays inverted $C_{55}$, the third track 304 shows $C_{44}$, the fourth track 306 shows $C_{66}$ from dipole dispersions, and the fifth track 308 shows measured bulk density $\rho$.

Figure 7B:
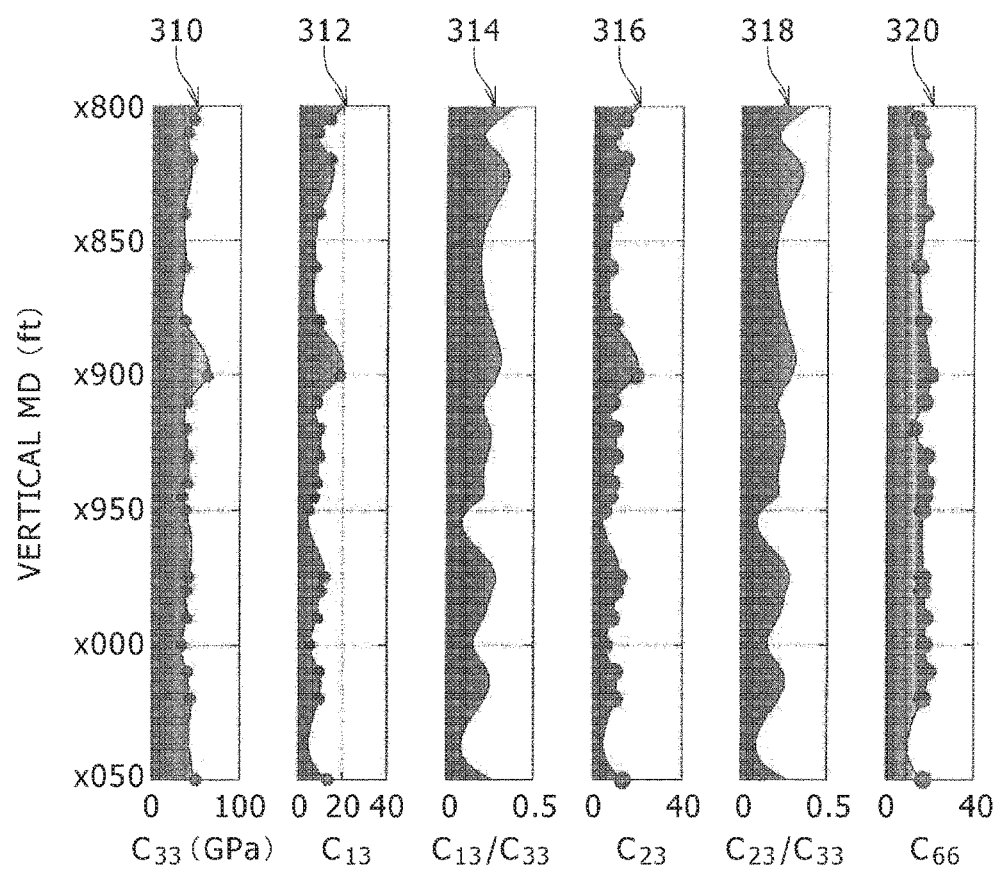
FIG. 7B is a graphical example of logs of elastic constants and ratios of $C_{13}/C_{33}$ and $C_{23}/C_{33}$ measured in a vertical well, according to an embodiment of the disclosure.

Similarly, FIG. 7B depicts variations in the elastic constants $C_{33}$, $C_{13}$, $C_{13}/C_{33}$, $C_{23}$, $C_{23}/C_{33}$, and $C_{66}$ as a function of vertical depth. In FIG. 7B, the first track 310 shows $C_{33}$ estimated from compressional slowness (DTc), the second track 312 shows inverted $C_{13}$, the third track 314 shows the ratio of $C_{13}/C_{33}$, the fourth and fifth tracks 316, 318, respectively, display inverted $C_{23}$ and $C_{23}/C_{33}$, and the sixth track 320 shows estimated $C_{66}$ from fast and slow dipole dispersions.

Figure 7C:
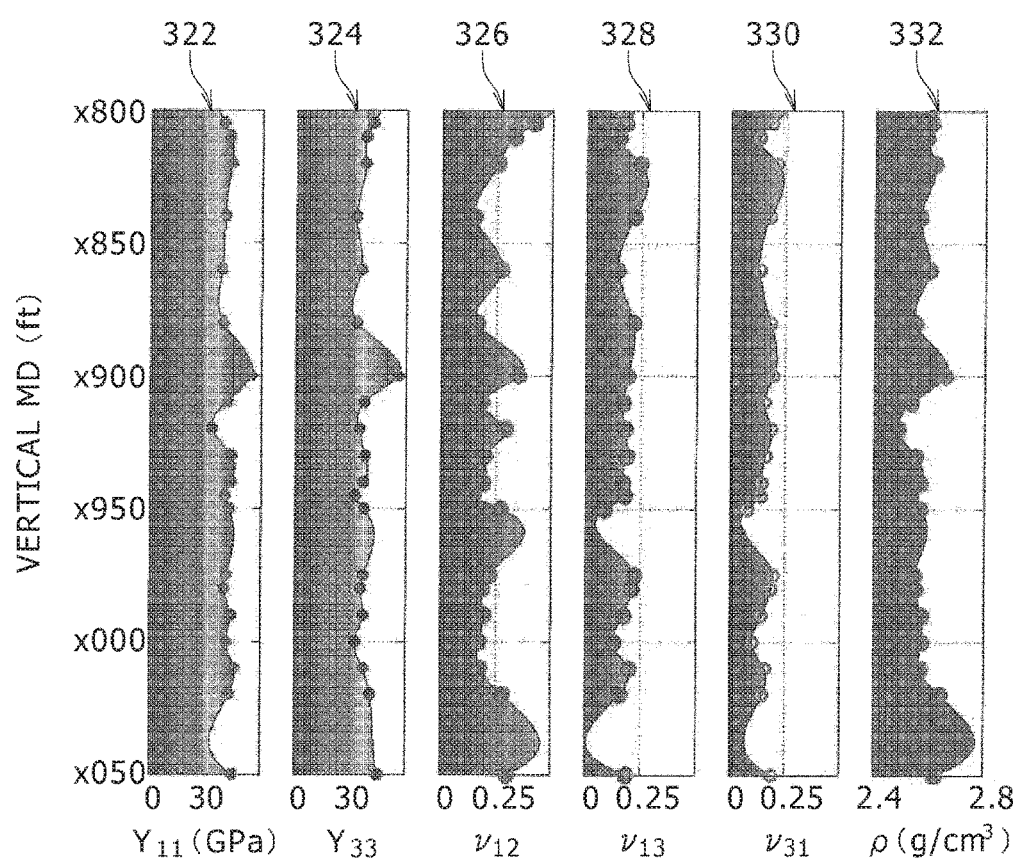
FIG. 7C is a graphical example of logs of Young's moduli, Poisson's ratios, and mass density measured in a vertical well, according to an embodiment of the disclosure.

FIG. 7C shows variations in the two Young's moduli, three Poisson's ratios, mass density as a function of vertical depth. In FIG. 7C, the first track 322 shows horizontal Young's modulus $Y_{11}$, the second track 324 displays the vertical Young's modulus $Y_{33}$, the third, fourth, and fifth tracks 326, 328, 330, respectively, show the Poisson's ratios $v_{12}$, $v_{13}$, and $v_{31}$, and the sixth track 332 displays the measured bulk density. Rock mechanical properties can be expressed in terms of the horizontal ($Y_{11}$) and vertical ($Y_{33}$) Young's moduli, and three Poisson's ratios in the $X_1$-$X_2$, $X_1$-$X_3$, and $X_3$-$X_1$ planes, respectively.

Figure 7D:
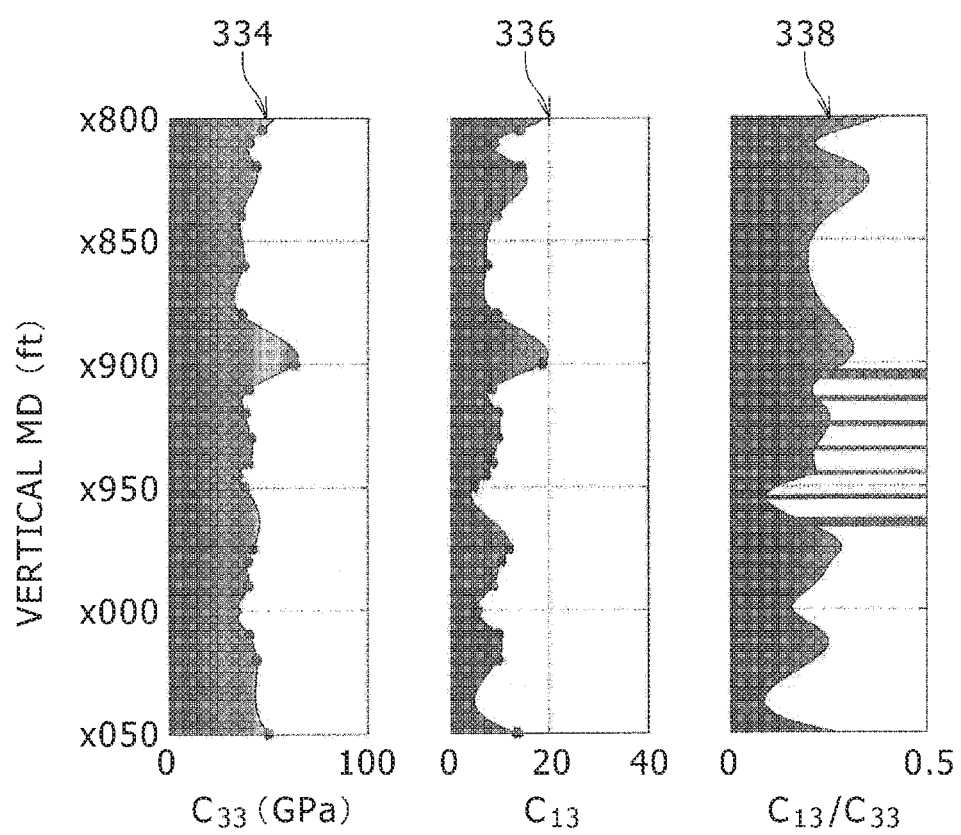
FIG. 7D is a graphical example of logs of elastic constants $C_{33}$, $C_{13}$ and the ratio of $C_{13}/C_{33}$ measured in a vertical well, according to an embodiment of the disclosure.

FIG. 7D illustrates variations in $C_{33}$, $C_{13}$, and the ratio $C_{13}/C_{33}$ as a function of vertical depth. In FIG. 7D, the first track 334 shows $C_{33}$ estimated from compressional slowness (DTc), the second track 336 displays inverted $C_{13}$, and the third track 338 shows the ratio of $C_{13}/C_{33}$. As shown in the foregoing equation (43), variations in the ratio $C_{13}/C_{33}$ can be used as a proxy for the minimum horizontal stress variation along the vertical direction. The horizontal lines in the third track 338 of FIG. 7D identify a depth interval that would be a preferred depth for the placement of a lateral. This is a preferred interval because the adjoining layers above and below exhibit higher minimum horizontal stresses that help to constrain the hydraulic fractures within the producing reservoir.

When the wellbore sonic data acquired from a horizontal producer well parallel to the $X_1$-direction is processed at multiple depths, the method can obtain a subset of orthorhombic constants from the inversion of cross-dipole dispersions. Logs of orthorhombic constants are then used to calculate differences between the maximum and minimum horizontal stress magnitudes. Variations in the stresses together with anisotropic mechanical properties along the lateral producer well are then used to identify fracturing stages and placement of perforation clusters for enhanced productivity of hydrocarbons from unconventional gas-shale or oil-shale reservoirs.

Figure 8A:
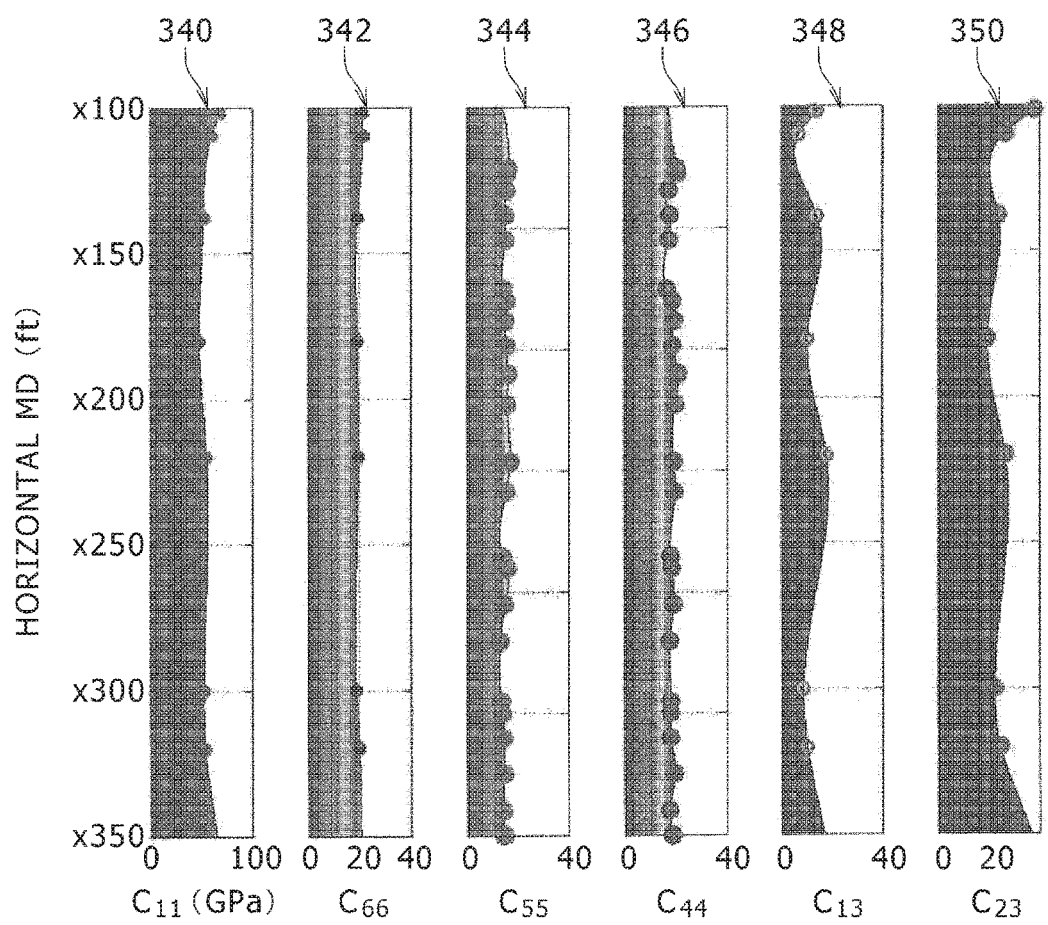
FIG. 8A is a graphical example of logs of elastic constants measured in a horizontal well, according to an embodiment of the disclosure.
Figure 8B:
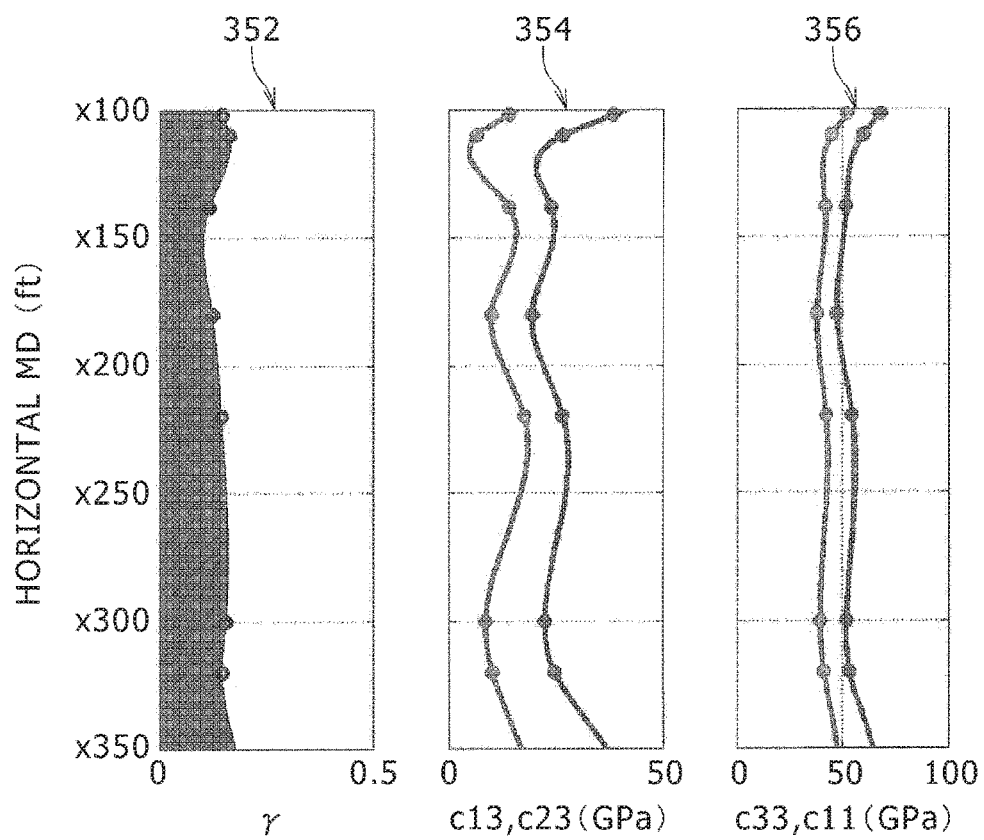
FIG. 8B is a graphical example of logs of Thomsen parameter $\gamma$ and elastic constants measured in a horizontal well, according to an embodiment of the disclosure.
Figure 8C:
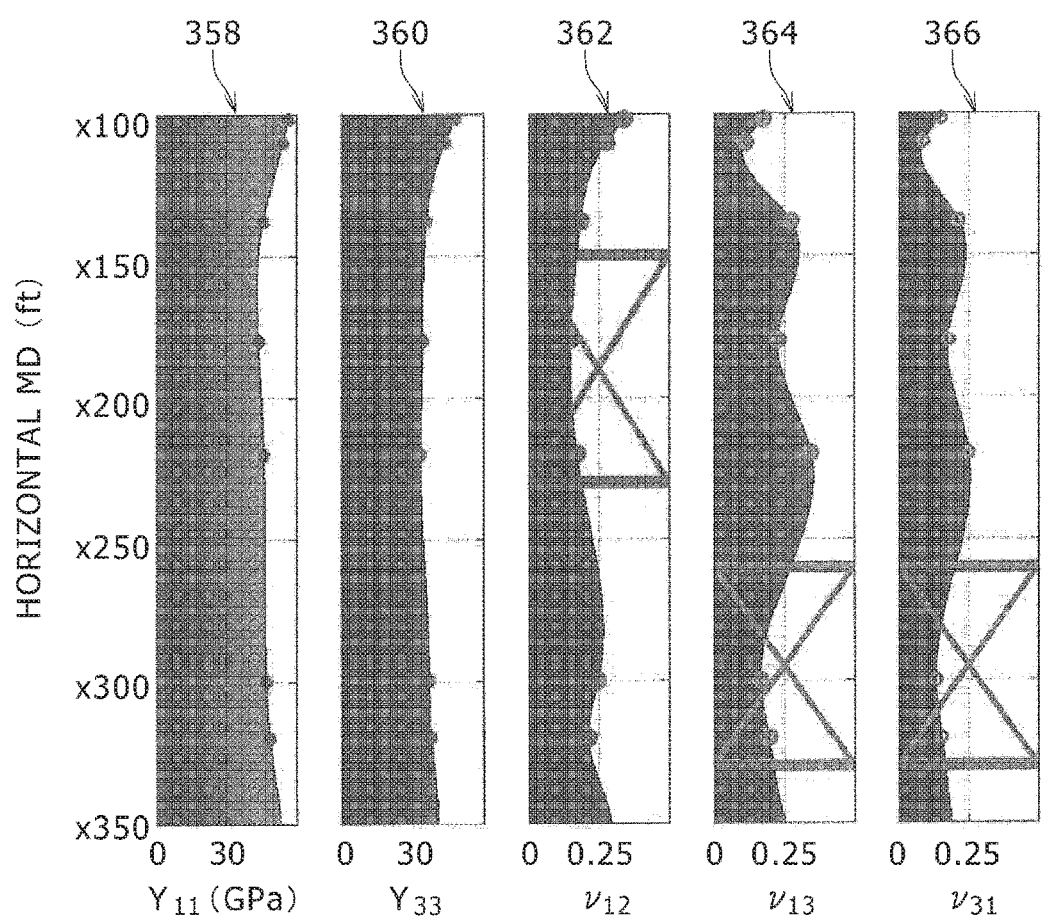
FIG. 8C is a graphical example of logs of Young's moduli and Poisson's ratios measured in a horizontal well, according to an embodiment of the disclosure.

FIGS. 8A-8C are graphical examples of logs measured in a horizontal well. FIG. 8A shows variations in a subset of orthorhombic constants $C_{11}$, $C_{66}$, $C_{55}$, $C_{44}$, $C_{13}$, and $C_{23}$ as a function of horizontal measured depth obtained from the inversion of cross-dipole dispersions. In FIG. 8A, the first track 340 shows $C_{11}$ estimated from compressional slowness (DTc), the second track 342 displays inverted $C_{66}$, the third track 344 shows $C_{55}$, the fourth track 346 shows $C_{44}$, the fifth and sixth tracks 348, 350, respectively, display inverted $C_{13}$ and $C_{23}$ from fast and slow dipole dispersions.

FIG. 8B displays variations in the Thomsen γ parameter together with the elastic constants $C_{13}$, $C_{23}$, $C_{33}$, and $C_{11}$, as a function of horizontal depth. In FIG. 8B, the first track 352 shows Thomsen parameter γ, the second track 354 displays inverted $C_{13}$ and $C_{23}$ from fast and slow dipole flexural dispersions, respectively, the third track 356 shows the compressional moduli $C_{11}$ and $C_{33}$, which are obtained by invoking a correlation between the Thomsen parameters γ=ε, for shale resource rocks. It is noted that the elastic constant $C_{33}$ is obtained from a known correlation between the Thomsen parameters γ and ε for resource shales.

Finally, FIG. 8C depicts variations of the horizontal and vertical Young's moduli together with the three Poisson's ratios in the $X_1$-$X_2$, $X_1$-$X_3$, and $X_3$-$X_1$ planes, as a function of horizontal depth. In FIG. 8C, the first track 358 shows Young's modulus $Y_{11}$, the second track 360 displays Young's modulus $Y_{33}$, the third track 362 shows Poisson's ratio $v_{12}$, the fourth and fifth tracks 364, 366, respectively, display Poisson's ratios $v_{13}$ and $v_{31}$. The cross-hatched interval in the third track 362 exhibits smaller values of the Poisson's ratio $v_{12}$ and implies that this interval is more amenable to support horizontal fractures in the $X_1$-$X_2$ plane. Similarly, smaller values of $v_{13}$ and $v_{31}$ in the cross-hatched intervals in the fourth and fifth tracks 364, 366 are likely to support vertical fractures in the $X_1$-$X_3$ plane. That is, the cross-hatched intervals in the third, fourth, and fifth tracks 362, 364, and 366 in FIG. 8C are preferred fracturing stages because a reduced value of Poisson's ratio implies higher fracturability of low-permeability shales.

Sonic data acquired in a vertical pilot well may provide logs of minimum horizontal stress and rock mechanical properties as a function of vertical depth. These logs together with the minimum horizontal stress azimuth help in optimal placement of a lateral producer well. One of the limitations of conventional workflow is that the elastic constant $C_{13}$ in a TIV formation with the TI-symmetry axis aligned parallel to the $X_3$-direction is not obtained from the sonic data acquired in a single well. Instead, this elastic constant $C_{13}$ is obtained either by invoking a rock physics model together with core plug data or inverting sonic data from both a vertical and deviated sections of the wellbore trajectory. Both of these approaches are not able to account for known heterogeneities in a gas-shale or oil-shale reservoirs. To overcome this limitation, various embodiments of the disclosure may analyze cross-dipole sonic data in a vertical pilot well and invert dipole flexural dispersions for the elastic constant $C_{13}$ in a TIV interval where the fast- and slow-dipole dispersions overlay. In contrast, when the fast and slow dipole dispersions indicate shear wave splitting, the fast dipole dispersion is inverted to obtain the elastic constant $C_{13}$, whereas the slow dipole dispersion is inverted to estimate the constant $C_{23}$. Intervals exhibiting differences between $C_{13}$ and $C_{23}$ are associated with orthorhombic anisotropy as is the case when differences exist between the maximum and minimum horizontal stresses. The fast-shear azimuth in intervals exhibiting crossing dipole dispersions may be also an indicator of the maximum horizontal stress azimuth. Differences between the ratios $C_{23}/C_{33}$ and $C_{13}/C_{33}$ can be used as a proxy for the differences between the maximum and minimum horizontal stresses as a function of vertical measured depth. Depth intervals placed between layers with higher minimum horizontal stresses are preferred to place a lateral in order to constrain the hydraulically induced fractures within a target reservoir layer.

Sonic data acquired in a lateral producer well may be processed to obtain logs of minimum horizontal stress as well as rock mechanical properties in terms of the Young's modulus and Poisson's ratio as a function of horizontal measured depth. These logs may be then used to select fracturing stages and placement of perforation clusters as part of the stimulation project. A first limitation of the conventional workflow is that estimates of horizontal stress magnitude are based on averaging $C_{13}$ over an enormously large volume of formation, and $C_{33}$ (that is estimated from the measured $C_{11}$ using a correlation between the Thomsen parameters γ and ε). A second limitation of the conventional workflow is that rock mechanical property variations are obtained based on isotropic constitutive relations in the absence of all TI-constants as a function of horizontal measured depth. In new technique in the disclosure, both the fast- and slow-dipole dispersions measured along a lateral may be inverted to obtain a sub-set of orthorhombic constants. These constants may be then used to obtain both the maximum and minimum horizontal stresses together with the anisotropic mechanical properties in terms of a vertical and horizontal Young's moduli and three Poisson's ratios in the vertical and horizontal planes associated with an effective TI-medium defined for the unconventional reservoir based on the measurement axes associated with the fast- and slow-dipole measurements. Intervals with similar stress profiles help to identify fracturing stages in the completion workflow. In addition, intervals with lower Poisson's ratios indicate higher fracturability and the three Poisson's ratios also help to identify whether hydraulically induced fractures are likely to be longitudinal or transverse fractures with respect to the lateral wellbore trajectory.

Figure 9:
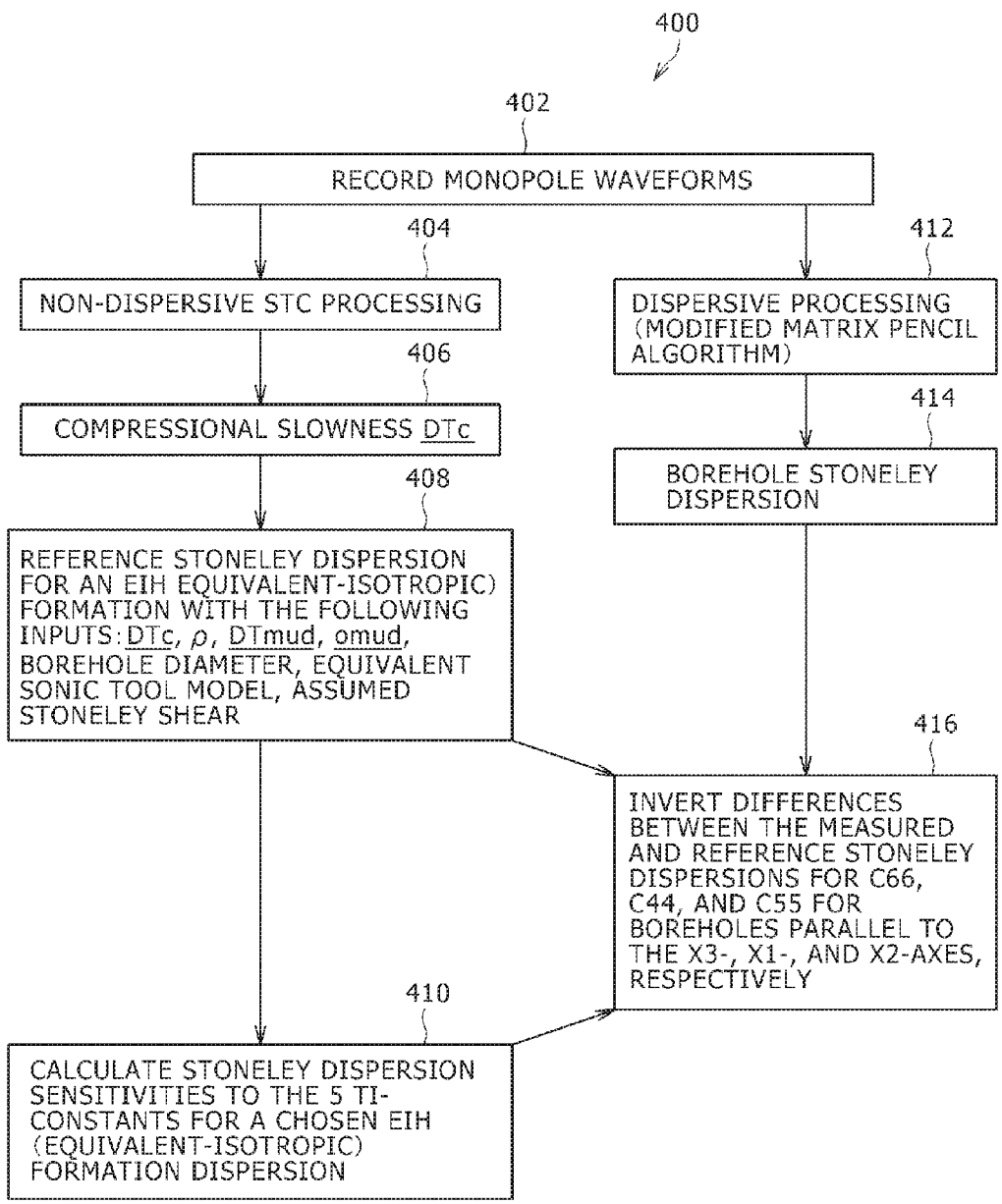
FIG. 9 is a flowchart representing an example of a method for estimating shear moduli in a cross-sectional plane of a wellbore parallel to the $X_3$-, $X_1$-, and $X_2$-directions, respectively, according to an embodiment of the disclosure.

FIG. 9 shows a flowchart representing an example of a method for estimating shear moduli in a cross-sectional plane of a wellbore parallel to the $X_3$-, $X_1$-, and $X_2$-directions, respectively. In FIG. 9, an EIH formation denotes an equivalent-isotropic and radially homogeneous formation. In this example of method 400, monopole waveforms are recorded as indicated by block 402. By way of example, the waveforms may be recorded in a suitable memory, such as a memory of a data collection and processing system described below.

The recorded monopole waveforms are then processed using a standard non-dispersive STC (Slowness-Time Coherence) algorithm to determine compressional slowness (DTc), as indicated by blocks 404 and 406. The compressional slowness (DTc) is used for determining a reference Stoneley dispersion for an equivalent-isotropic and radially homogeneous (EIH) formation together with formation bulk density $\rho$, mud compressional slowness (DTmud), mud density $\rho_{mud}$, borehole diameter, equivalent sonic tool model and assumed Stoneley shear, as indicated block 408. Then, a reference Stoneley sensitivities to the five TI (Transversely-Isotropic)-constants for a chosen EIH formation are calculated, as indicated in block 410.

The recorded monopole waveforms are also processed using the Modified Matrix Pencil algorithm to determine borehole Stoneley dispersion, as indicated by blocks 412 and 414. Differences between the measured and reference Stoneley dispersions are inverted for the elastic constants $C_{66}$, $C_{44}$, and $C_{55}$ for boreholes parallel to the $X_3$-, $X_1$-, and $X_2$-axes, respectively, by using the reference Stoneley dispersion and the Stoneley dispersion sensitivities, as indicated by block 416.

Figure 10:
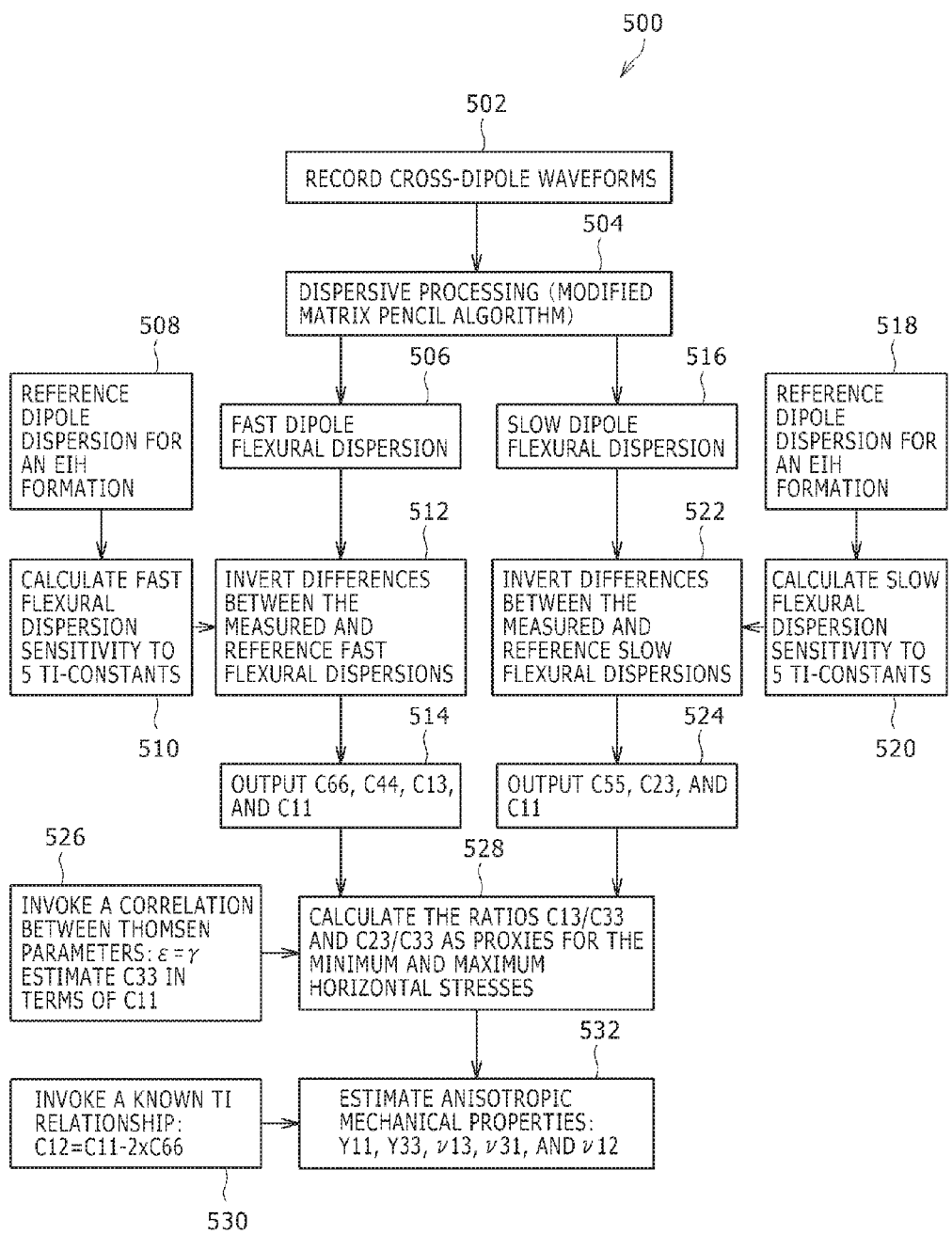
FIG. 10 is a flowchart representing an example of another method for estimating a subset of orthorhombic constants and formation mechanical properties using sonic data along a lateral (horizontal) producer well parallel to the $X_1$-axis, according to an embodiment of the disclosure.

FIG. 10 shows a flowchart representing an example of another method for estimating a subset of orthorhombic constants and formation mechanical properties using sonic data along a lateral (horizontal) producer well parallel to the $X_1$-axis. In this example of method 500, cross-dipole waveforms are recorded and processed using the Modified Matrix Pencil algorithm, as indicated by blocks 502 and 504. By processing the measured cross-dipole waveforms, a fast dipole flexural dispersion is obtained, as indicated by block 506. A fast reference dispersion for an EIH formation is also determined and a fast reference flexural sensitivities to the five TI-constants for a chosen EIH formation are calculated, as indicated in blocks 508, 510. Differences between the measured and reference fast flexural dispersions are inverted for the elastic constants $C_{66}$, $C_{44}$, $C_{13}$, and $C_{11}$, respectively, and the elastic constants $C_{66}$, $C_{44}$, $C_{13}$, and $C_{11}$ are output, as indicated by blocks 512, 514.

Similarly, by processing the measured cross-dipole waveforms, a slow dipole flexural dispersion is obtained, as indicated by block 516. A slow reference dispersion for an EIH formation is also determined and a slow reference flexural sensitivities to the five TI-constants for a chosen EIH formation are calculated, as indicated in blocks 518, 520. Differences between the measured and reference slow flexural dispersions are inverted for the elastic constants $C_{55}$, $C_{23}$, and $C_{11}$, respectively, and the elastic constants $C_{55}$, $C_{23}$, and $C_{11}$ are output, as indicated by blocks 522, 524.

Invoking a correlation ($\gamma=\epsilon$) between the Thomsen parameters $\gamma$ and $\epsilon$, the elastic constants $C_{33}$ is estimated in terms of the elastic constant $C_{11}$, as indicated by block 526. By using the foregoing output vales of elastic constants and the estimated elastic constants $C_{33}$, the ratios $C_{13}/C_{33}$ and $C_{23}/C_{33}$ are calculated as proxies for the minimum and maximum horizontal stresses, as indicated by block 528.

Further, invoking a known relationship ($C_{12}=C_{11}-2\times C_{66}$) of TI (transversely-isotropic) anisotropy for the shale lithology, the horizontal ($Y_{11}$) and vertical ($Y_{33}$) Young's moduli, and the horizontal Poisson's ratio ($v_{12}$) and vertical Poisson's ratios ($v_{13}$ and $v_{31}$) are estimated as anisotropic mechanical properties, as indicated by blocks 530, 532.

The sonic data used in the inversion method described herein can be collected using a wellbore logging tool, such as a wireline logging tool. For example, the sonic data can be collected using dipole sonic logging module of the wireline tool. Other wellbore tools and wellbore tool configurations can also be used to acquire the sonic well log data. For example, the wireline logging tool can be conveyed by other means, such as coiled tubing. Furthermore, sonic well log data can be acquired using other wellbore logging tools, such as a logging-while-drilling (LWD) tool.

The method described herein for estimating properties of a formation can be performed by a processing system. The processing system is not limited to any particular device type or system. The processing system may be a computer, such as a laptop computer, a desktop computer, or a mainframe computer. The processing system may include a graphical user interface (GUI) so that a user can interact with the processing system. The processing system may also include a processor (e.g., a microprocessor, microcontroller, digital signal processor, or general purpose computer) for executing any of the methods and processes described above.

The processing system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. This memory may be used to store, for example, formation data, sonic well log data, and properties of the formation.

Any of the methods and processes described above can be implemented as computer program logic for use with the processing system. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the processing system. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processing system may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Figure 11:
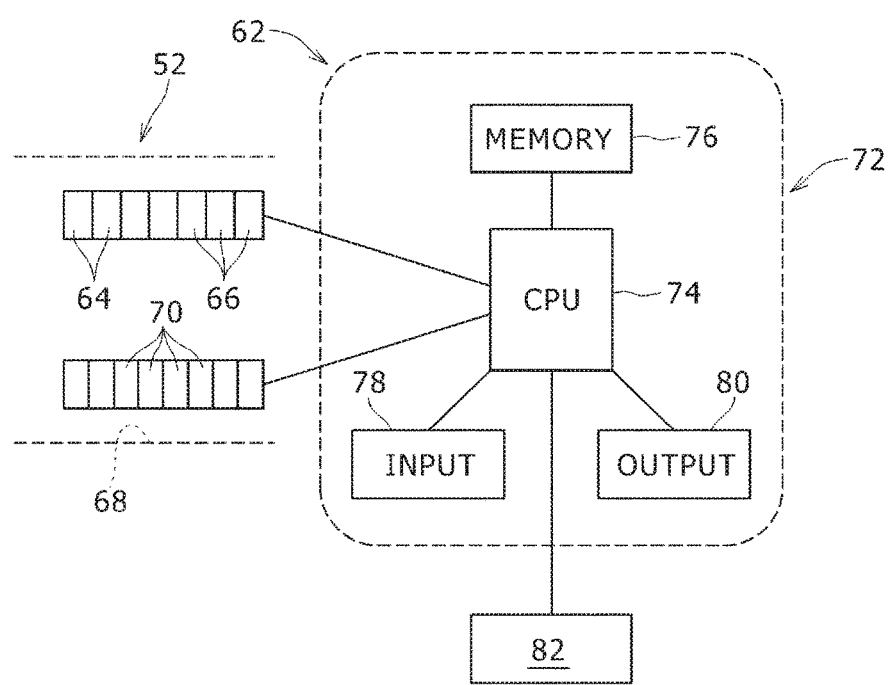
FIG. 11 is a schematic illustration of one example of a data acquisition and processing system that may be used to estimate elastic constants within a formation, according to an embodiment of the disclosure.

FIG. 11 shows a schematic illustration of one example of a data acquisition and processing system 62 that may be used to estimate elastic constants within a formation. In this example, a plurality of acoustic sources, e.g. monopole sources 64 and dipole sources 66, is placed in a fluid filled borehole 68 of wellbore 52. Additionally, an array of receivers 70 also is placed in wellbore 52. Depending on the application, some of the acoustic sources 64, 66 and/or some of the receivers 70 may be placed at locations outside of the wellbore 52. The data collection and processing system 62 may be used to estimate elastic constants within a formation.

As further illustrated in FIG. 11, the acoustic sources 64, 66 and the array of receivers 70 may be coupled with a control/processing system 72. In this example, processing system 72 may comprise a processor 74 in the form of a central processing unit (CPU), e.g. a microprocessor. The processor 74 is operatively employed to intake and process data obtained from sources 64, 66 and the array of receivers 70. The processor 74 may be operatively coupled with a memory 76, an input device 78, and an output device 80. Memory 76 may be used to store many types of data, such as data collected and updated via the array of receivers 70. Input device 78 may comprise a variety of devices, such as a keyboard, mouse, voice recognition unit, touchscreen, other input devices, or combinations of such devices. Output device 80 may comprise a visual and/or audio output device, such as a computer display, monitor, or other display medium having a graphical user interface. Additionally, the processing may be done on a single device or multiple devices locally, at a remote location, or with some local devices and other devices located remotely, e.g. a server/ client system.

The processor system 72 is able to work with selected algorithms, programs, and/or models for processing data obtained from receivers 70. The processor system 72 also may function as a control system for controlling actuation of acoustic sources 64, 66. Depending on the application, the algorithms, programs, and/or models for processing collected data and/or for controlling the acoustic sources may be contained in a variety of software modules 82 which may be downloaded to system 72.

According to an example of a workflow for estimating elastic constants within a formation, synthetic waveforms are generated using monopole sources 64 and dipole sources 66 which are placed in the fluid-filled borehole 68.

The technique may be employed in many types of wells having a variety of boreholes. The wells may comprise deviated boreholes, single boreholes, multiple boreholes, as well as many arrangements and sizes of boreholes. The method can further be used with a wide variety of fracturing techniques used to form many types of fractures in a given formation. Similarly, the method and analysis may be performed to estimate anisotropic mechanical properties in a wide range of formations and subterranean environments.

Although several example embodiments have been described in detail above, those skilled in the art will readily appreciate that many modifications are possible in the example embodiments without materially departing from the scope of this disclosure. Accordingly, all such modifications are intended to be included within the scope of this disclosure.

What is claimed is:

1. A method for estimating elastic constants within a formation, the method comprising:
   applying acoustic waves to the formation, wherein the formation is heterogeneous;
   detecting acoustic waves to acquire acoustic data;
   determining (i) at least one of elastic constant $C_{13}$ using a fast-dipole dispersion and elastic constant $C_{23}$ using a slow-dipole dispersion, (ii) elastic constant $C_{33}$, (iii) at least one of elastic constant $C_{44}$ and elastic constant $C_{55}$, and (iv) elastic constant $C_{66}$ using the acquired acoustic data;
   determining elastic constant $C_{11}$ using (i) elastic constant $C_{33}$, (ii) at least one of elastic constant $C_{44}$ and elastic constant $C_{55}$, (iii) elastic constant $C_{66}$, and (iv) a relationship between Thomsen parameter gamma and Thomsen parameterepsilon;
   determining minimum and maximum horizontal stresses for the formation using (i) elastic constant $C_{11}$, (ii) at least one of elastic constant $C_{13}$ and elastic constant $C_{23}$, (iii) elastic constant $C_{33}$, and (iv) elastic constant $C_{66}$; and
   determining placement of a lateral wellbore along a vertical pilot well using the minimum and maximum horizontal stresses for the formation,
   wherein the elastic constants $C_{11}$, $C_{13}$, $C_{23}$, $C_{33}$, $C_{44}$, $C_{55}$, and $C_{66}$ are in Voigt form.

2. The method of claim 1, wherein (i) elastic constant $C_{13}$ is determined and (ii) elastic constant $C_{33}$, (iii) elastic constant $C_{55}$, and (iv) elastic constant $C_{66}$ are determined using a fast-dipole dispersion.

3. The method of claim 1, wherein (i) elastic constant $C_{23}$ is determined and (ii) elastic constant $C_{33}$, (iii) elastic constant $C_{44}$, and (iv) elastic constant $C_{66}$ are determined using a slow-dipole dispersion.

4. The method of claim 1, wherein elastic constant $C_{33}$ is determined using a measured compressional velocity.

5. The method of claim 1, wherein elastic constant $C_{66}$ is determined using a Stoneley dispersion.

6. The method of claim 1, further comprising:
   determining a vertical Young's modulus, horizontal Young's modulus, a horizontal Poisson's ratio, and two vertical Poisson's ratios using (i) elastic constant $C_{11}$, (ii) at least one of elastic constant $C_{13}$ and elastic constant $C_{23}$, and (iii) elastic constant $C_{33}$.

7. The method of claim 1, wherein the acoustic waves are applied to the formation using a wellbore tool that is disposed within a wellbore that traverses the formation; and acoustic waves are detected using the wellbore tool.

8. The method of claim 1, wherein the formation is an unconventional hydrocarbon reservoir.

9. A method for estimating elastic constants within a formation, the method comprising:
   applying acoustic waves to the formation, wherein the formation is heterogeneous;
   detecting acoustic waves to acquire acoustic data;
   determining (i) elastic constant $C_{11}$, (ii) at least one of elastic constant $C_{13}$ using a fast-dipole dispersion and elastic constant $C_{23}$ using a slow-dipole dispersion, (iii) at least one of elastic constant $C_{44}$ and elastic constant $C_{55}$, and (iv) elastic constant $C_{66}$ using the acquired acoustic data;
   determining elastic constant $C_{33}$ using (i) elastic constant $C_{11}$, (ii) at least one of elastic constant $C_{44}$ and elastic constant $C_{55}$, (iii) elastic constant $C_{66}$, and (iv) a relationship between Thomsen parameter gamma and Thomsen parameterepsilon;
   determining a vertical Young's modulus, horizontal Young's modulus, a horizontal Poisson's ratio, and two vertical Poisson's ratios using (i) elastic constant $C_{11}$, (ii) at least one of elastic constant $C_{13}$ and elastic constant $C_{23}$, and (iii) elastic constant $C_{33}$; and
   determining placement of completions along a lateral wellbore using at least one of the three Poisson's ratios,
   wherein the elastic constants $C_{11}$, $C_{13}$, $C_{23}$, $C_{33}$, $C_{44}$, $C_{55}$, and $C_{66}$ are in Voigt form.

10. The method of claim 9, wherein (i) elastic constant $C_{13}$ is determined and (ii) elastic constant $C_{44}$, and (iii) elastic constant $C_{66}$ are determined using a fast-dipole dispersion.

11. The method of claim 9, wherein (i) elastic constant $C_{23}$ is determined and (ii) elastic constant $C_{55}$ is determined using a slow-dipole dispersion.

12. The method of claim 9, wherein elastic constant $C_{11}$ is determined using a measured compressional velocity.

13. The method of claim 9, further comprising:
   determining placement of fractures along a lateral wellbore using at least one of the three Poisson's ratios.

14. The method of claim 9, wherein the acoustic waves are applied to the formation using a wellbore tool that is disposed within a wellbore that traverses the formation; and acoustic waves are detected using the wellbore tool.

15. The method of claim 9, wherein the formation is an unconventional hydrocarbon reservoir.

16. A system for estimating elastic constants within a formation, comprising:
   a plurality of acoustic sources for applying acoustic waves to the formation wherein the formation is heterogeneous;
   an array of receivers for detecting acoustic waves to acquire acoustic data;
   a processor system having:
      a memory to record waveforms of the acoustic waves; and
      a processor used to evaluate the waveforms to determine (i) elastic constant $C_{11}$, (ii) at least one of elastic constant $C_{13}$ using a fast-dipole dispersion and elastic constant $C_{23}$ using a slow-dipole dispersion, (iii) at least one of elastic constant $C_{44}$ and elastic constant $C_{55}$, and (iv) elastic constant $C_{66}$ using the acquired acoustic data, to determine elastic constant $C_{33}$ using (i) elastic constant $C_{11}$, (ii) at least one of elastic constant $C_{44}$ and elastic constant $C_{55}$, (iii) elastic constant $C_{66}$, and (iv) a relationship between Thomsen parameter gamma and Thomsen parameter epsilon, to determine a vertical Young's modulus, horizontal Young's modulus, a horizontal Poisson's ratio, and two vertical Poisson's ratios using (i) elastic constant $C_{11}$, (ii) at least one of elastic constant $C_{13}$ and elastic constant $C_{23}$, and (iii) elastic constant $C_{33}$, and to determine placement of fractures along a lateral wellbore using at least one of the three Poisson's ratios,
   wherein the elastic constants $C_{11}$, $C_{13}$, $C_{23}$, $C_{33}$, $C_{44}$, $C_{55}$, and $C_{66}$ are in Voigt form.

* * * * *